US008295556B2

(12) United States Patent
Ohtani et al.

(10) Patent No.: US 8,295,556 B2
(45) Date of Patent: Oct. 23, 2012

(54) APPARATUS AND METHOD FOR DETERMINING LINE-OF-SIGHT DIRECTION IN A FACE IMAGE AND CONTROLLING CAMERA OPERATIONS THEREFROM

(75) Inventors: Shinya Ohtani, Kanagawa (JP); Atsushi Okubo, Tokyo (JP)

(73) Assignee: Sony Corporation, Tokyo (JP)

( * ) Notice: Subject to any disclaimer, the term of this patent is extended or adjusted under 35 U.S.C. 154(b) by 820 days.

(21) Appl. No.: 12/197,408

(22) Filed: Aug. 25, 2008

(65) Prior Publication Data
US 2009/0060291 A1   Mar. 5, 2009

(30) Foreign Application Priority Data

Sep. 3, 2007  (JP) ................................. 2007-227262

(51) Int. Cl.
*G06K 9/00* (2006.01)
*G03B 17/50* (2006.01)
(52) U.S. Cl. .......................................... 382/118; 396/51
(58) Field of Classification Search .................... 382/118
See application file for complete search history.

(56) References Cited

U.S. PATENT DOCUMENTS

| | | | | |
|---|---|---|---|---|
| 5,640,610 A * | 6/1997 | Sato et al. | ...... | 396/51 |
| 5,671,447 A * | 9/1997 | Tokunaga | ...... | 396/51 |
| 5,737,642 A * | 4/1998 | Aoyama | ...... | 396/51 |
| 6,033,072 A * | 3/2000 | Ono et al. | ...... | 351/208 |
| 6,246,779 B1 * | 6/2001 | Fukui et al. | ...... | 382/103 |
| RE38,884 E * | 11/2005 | Kakii | ...... | 348/14.16 |
| 7,127,086 B2 * | 10/2006 | Yuasa et al. | ...... | 382/118 |
| 7,246,904 B2 * | 7/2007 | Knaan et al. | ...... | 351/209 |
| 2002/0122572 A1 * | 9/2002 | Seal et al. | ...... | 382/117 |
| 2003/0123713 A1 * | 7/2003 | Geng | ...... | 382/118 |

(Continued)

FOREIGN PATENT DOCUMENTS

JP        11-175246        7/1999

(Continued)

OTHER PUBLICATIONS

Office Aciton issued Jul. 12, 2011 in Japaense Patent Application No. 2007-227262.

(Continued)

*Primary Examiner* — David Zarka
(74) *Attorney, Agent, or Firm* — Oblon, Spivak, McClelland, Maier & Neustadt, L.L.P.

(57) ABSTRACT

An information processing apparatus includes a face detecting unit that detects a face area included in image data, a face-component detecting unit that detects a face component from the face area detected by the face detecting unit, and a line-of-sight discriminating unit that executes line-of-sight discrimination processing for a face image from which the face component is detected by the face-component detecting unit. The line-of-sight discriminating unit executes processing for discriminating whether a line of sight of the face image data from which the face component is detected is in a positive state in which a line of sight is directed in a camera direction or a negative state in which a line of sight is not directed in a camera direction according to collation processing for a line-of-sight discrimination dictionary in which learning data including classification data corresponding to the respective states are stored and input face image data.

31 Claims, 13 Drawing Sheets

U.S. PATENT DOCUMENTS

| | | | |
|---|---|---|---|
| 2003/0169906 A1* | 9/2003 | Gokturk et al. | 382/115 |
| 2004/0208114 A1* | 10/2004 | Lao et al. | 369/125 |
| 2005/0122401 A1* | 6/2005 | Horie | 348/207.99 |
| 2007/0014552 A1* | 1/2007 | Ebisawa | 396/51 |
| 2007/0036397 A1* | 2/2007 | Hamza | 382/117 |
| 2007/0089054 A1* | 4/2007 | Morimoto | 715/700 |
| 2007/0189742 A1* | 8/2007 | Knaan et al. | 396/18 |

FOREIGN PATENT DOCUMENTS

| | | |
|---|---|---|
| JP | 2006-319610 | 11/2006 |
| JP | 2006-350704 | 12/2006 |
| JP | 2007-11935 | 1/2007 |
| JP | 2007-265367 | 10/2007 |

OTHER PUBLICATIONS

Office Action mailed on Nov. 15, 2012 in Japanese Application No. 2007-227262.

Takahiro Ishikawa, et al., "Passive Driver Gaze Tracking with Active Appearance Models", The Robotics Institute Carnegie Mellon University, Proceedings of the 11$^{th}$ World Congress on Intelligent Transportation Systems, pp. 1-18, CMU-RI TR-04-08, 2004.

Takehiko Ohno, et al., "An Eyeball Model Based Eye Tracking Method", NTT Comunication Science Laboratories, NTT Corporation, Department of Information Technology, NTT Data, pp. 307-312 (with English translation, 17 pages), 2002.

* cited by examiner

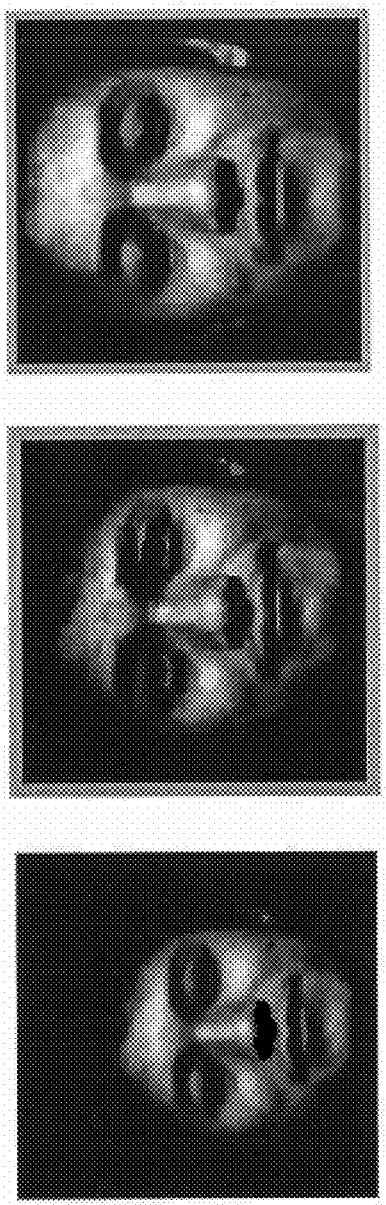
FIG. 1

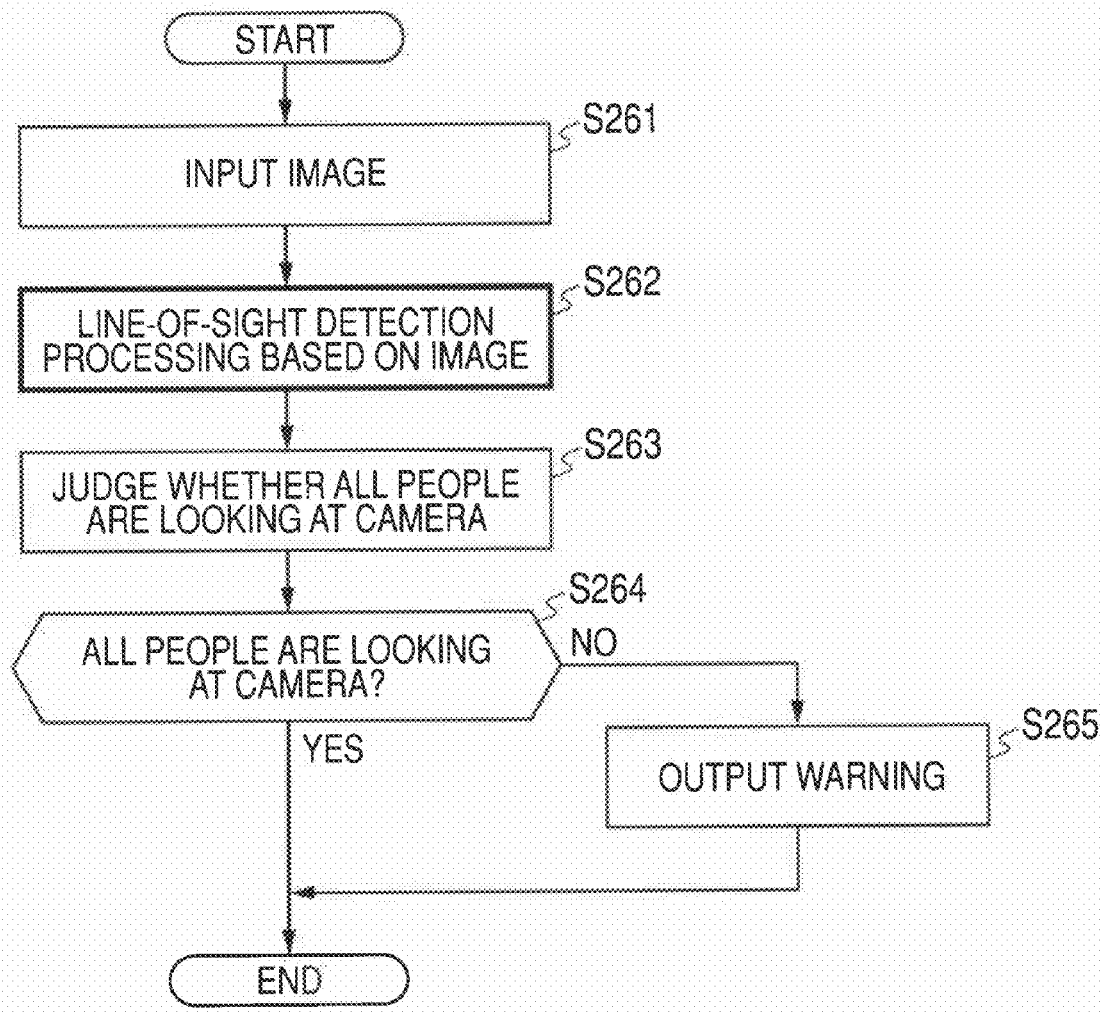

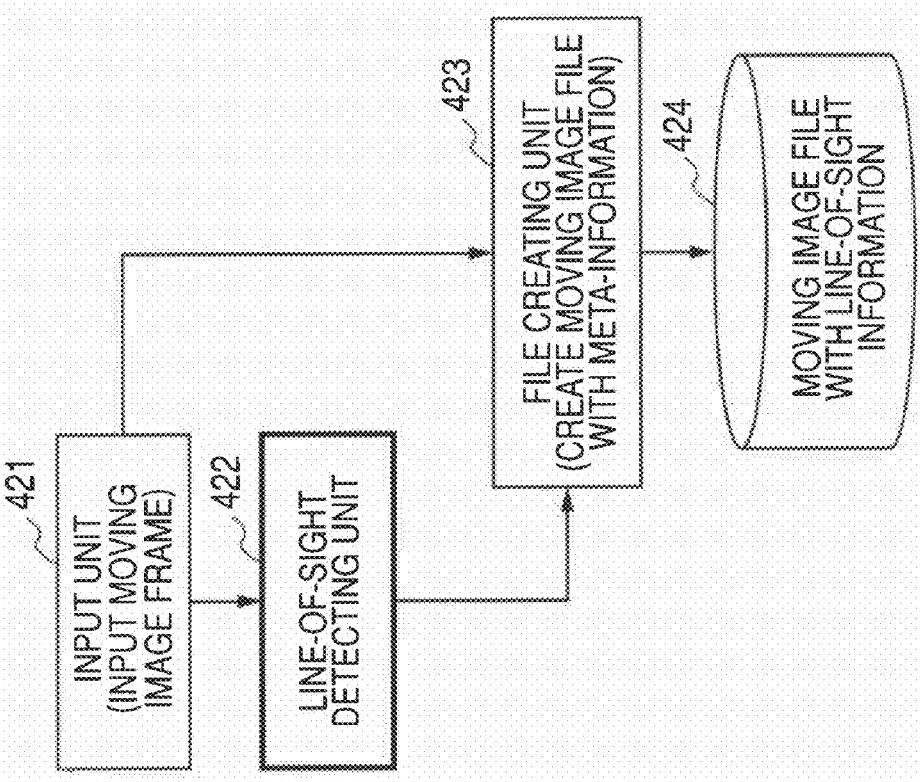
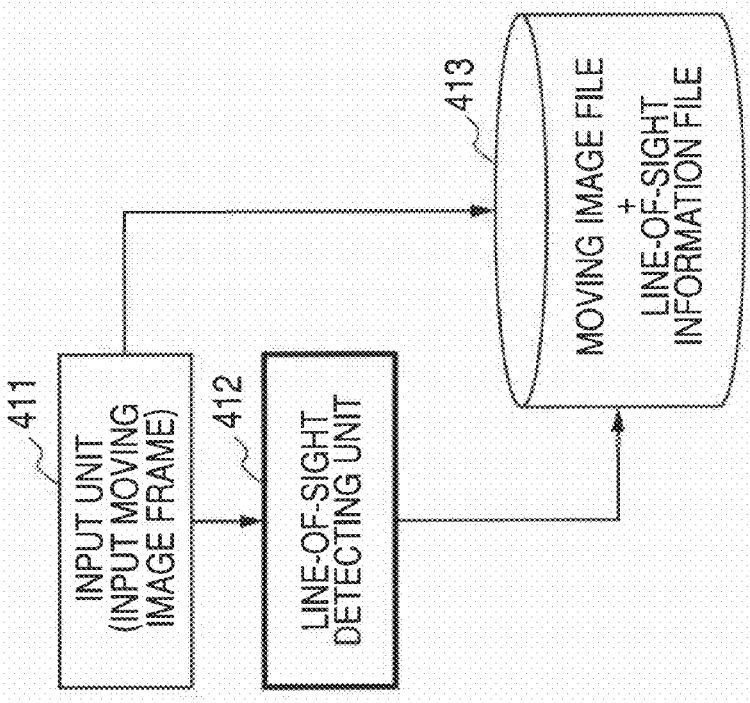

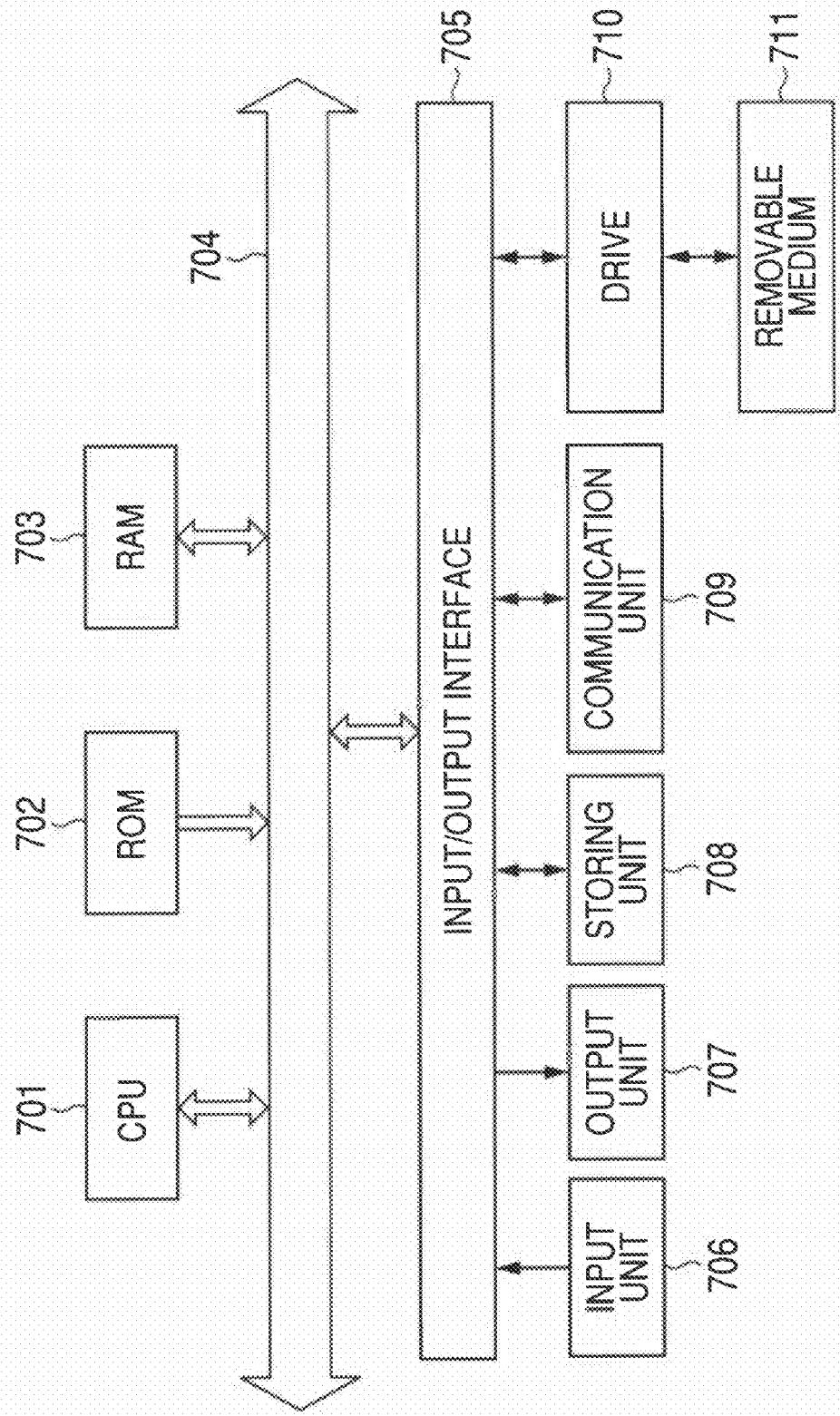

APPARATUS AND METHOD FOR DETERMINING LINE-OF-SIGHT DIRECTION IN A FACE IMAGE AND CONTROLLING CAMERA OPERATIONS THEREFROM

CROSS-REFERENCES TO RELATED APPLICATIONS

The present invention contains subject matter related to Japanese Patent Application JP 2007-227262 filed in the Japanese Patent Office on Sep. 3, 2007, the entire contents of which being incorporated herein by reference.

BACKGROUND OF THE INVENTION

1. Field of the Invention

The present invention relates to an information processing apparatus, an information processing method, and a computer program, and, more particularly to an information processing apparatus, an information processing method, and a computer program for executing processing for detecting, by analyzing an image photographed by a camera, a line of sight direction of a person, an animal, or the like included in the photographed image.

2. Description of the Related Art

When a line of sight of a person, a pet such as a dog or a cat, or an animal can be judged from an image acquired by a camera, for example, it is possible to operate a shutter at an instance when the line of sight is directed to the camera. Therefore, it is possible to reduce failures in photographing pictures. When a program for executing processing for such judgment on a line of sight is incorporated in, for example, moving image creation software, it is possible to efficiently sort out moving images, for example, select an image including a person looking to the front out of a large number of photograph data.

When the line-of-sight-judgment-processing execution program is incorporated in an interactive system such as a television conference system, it is possible to perform smooth interaction by performing switching of a camera, setting of a camera direction, zooming, and the like according to a line of sight.

As one of related arts that disclose a technique for performing line-of-sight judgment from image data photographed by a camera, there is line-of-sight direction detection. The light-of-sight direction detection is a technique for estimating which direction a user in a camera is looking. The light-of-sight direction detection is performed by reading a subtle positional relation between positions of the irises. For example, in the technique disclosed in "Passive Driver Gaze Tracking with Active Appearance Models", T. Ishikawa, S. Baker, I. Matthews, and T. Kanade, Proceedings of the 11th World Congress on Intelligent Transportation Systems, October, 2004 (hereinafter, Non-Patent Document 1), a posture of a detected face is calculated by AAM (Active Appearance Models), positions of the irises are detected from portions of the eyes, a posture of the eyeballs is estimated from a positional relation between the eyes and the irises, and an overall line-of-sight direction is estimated by combining the posture of the eyeballs with the posture of the face.

However, in Non-Patent Document 1, the irises and fine image input are necessary for estimation of a posture of the eyeballs. For this purpose, it is indispensable to use a high-performance high-resolution camera. When a general user performs photographing with a camera set in a position 2 m to 3 m away from the user in a living room of a house, it is difficult to use a general camera having about one million pixels.

To realize the technique disclosed in Non-Patent Document 1, it is necessary to use an expensive camera with a high number of pixels. Further, special processing for improving accuracy such as processing for zoom-photographing a portion of the eyes of a subject to improve accuracy of measurement of iris positions and processing for irradiating an infrared ray on the eyes and increasing the luminance of retina and sphere portions of the eyes to accurately photograph a subject are necessary. Moreover, it is necessary to perform face posture estimation to estimate positions of the eyes and a posture of the eyeballs. Therefore, processing is complicated and errors in the line-of-sight direction detection increase.

In "Line-of-Sight Direction Recognition for an Interactive System", Toshihiko Yamahata and Shinya Fujie, Image Recognition and Understanding Symposium (MIRU2006), a method of abandoning line-of-sight direction estimation in an analog value and performing light-of-sight direction judgment according to processing for classifying line-of-sight directions into ten classes is disclosed. When the line-of-sight directions are classified in a predetermined range in this way, it is unnecessary to estimate an accurate posture of the eyeballs. It is possible to output a recognition result from an image of an eye portion by applying the PCA (principal component analysis), the LDA (linear discrimination analysis), and the like. As a result, the problem of error dispersion due to recognizer serialization is solved.

However, to dimensionally compress the image of the eye portion with the PCA (principal component analysis) and linearly discriminate the image with the LDA (linear discrimination analysis), it is necessary to solve the problems of classification of line-of-sight directions into ten classes. However, it is difficult to solve this problem robustly (stably).

In "Line-of-Sight Measuring Method based on an Eyeball Shape Model", Takehiko Ohno, Naoki Takekawa, and Atsushi Yoshikawa (NTT Communications Science Laboratories) Proceedings of the 8th Image Sensing Symposium, pp. 307 to 312, a method for line-of-sight direction estimation by the corneal reflex method is disclosed. This is a method of estimating a line of sight from the pupil center and positions of Purkinje's images. With the method, it is possible to highly accurately estimate a line of sight. Further, since it is possible to estimate a line of sight regardless of a direction of a face, the estimation is not affected by an error of a face posture recognizer.

However, to extract Purkinje's images, light has to be irradiated from a position fixed with respect to a camera. Therefore, a device is complicated. Moreover, there is an individual difference in a relation among Purkinje's images, the pupil center, and a line-of-sight direction, calibration has to be performed every time a person changes.

SUMMARY OF THE INVENTION

Therefore, it is desirable to provide an information processing apparatus, an information processing method, and a computer program for efficiently detecting, by analyzing an image photographed by a camera, a line-of-sight direction of a person, an animal, or the like included in the photographed image.

More specifically, it is desirable to provide an information processing apparatus, an information processing method, and a computer program for discriminating, by analyzing an image photographed by a camera, whether a line of sight of a person, an animal, or the like included in the photographed image is directed to the camera.

According to an embodiment of the present invention, there is provided an information processing apparatus including a face detecting unit that detects a face area included in image data, a face-component detecting unit that detects a face component (a face part) from the face area detected by the face detecting unit, and a line-of-sight discriminating unit that executes line-of-sight discrimination processing for a face image from which the face component is detected by the face-component detecting unit, wherein the line-of-sight discriminating unit executes processing for discriminating whether a line of sight of the face image data from which the face component is detected is in a positive state in which a line of sight is directed in a camera direction or a negative state in which a line of sight is not directed in a camera direction according to collation processing for a line-of-sight discrimination dictionary in which learning data including classification data corresponding to the respective states are stored and input face image data.

In the information processing apparatus according to the embodiment, the face-component detecting unit detects eyes, a nose, and a mouth from the face area detected by the face detecting unit, and the line-of-sight discriminating unit executes the line-of-sight discrimination processing for the face image data from which the eyes, the nose, and the mouth are detected.

In the information processing apparatus according to the embodiment, the line-of-sight discriminating unit executes the line-of-sight discrimination processing according to processing employing a PixDif algorism that uses a difference value of a pixel pair in a specific position of an image as comparison and collation data.

In the information processing apparatus according to the embodiment, the information processing apparatus further includes an image processing unit that executes rotation processing, size normalization processing, and face-area slicing processing for the face image from which the face component is detected by the face-component detecting unit, and the line-of-sight discriminating unit inputs the image processed by the image processing unit and executes the line-of-sight discrimination processing.

In the information processing apparatus according to the embodiment, the face detecting unit executes, with reference to a face detection dictionary in which various kinds of face area image information are stored, face-area detection processing for a face area included in the image data using a PixDif algorism that uses a difference value of a pixel pair in a specific position of an image as comparison and collation data.

In the information processing apparatus according to the embodiment, the face-component detecting unit executes, with reference to a face component detection dictionary in which various kinds of face component image information are stored, face-component detection processing for detection of a face component from the face area detected by the face detecting unit using a PixDif algorism that uses a difference value of a pixel pair in a specific position of an image as comparison and collation data.

In the information processing apparatus according to the embodiment, the information processing apparatus further includes a sound recognizing unit that executes sound recognition processing, and the information processing apparatus combines a line-of-sight discrimination result in the line-of-sight discriminating unit and a sound recognition result in the sound recognizing unit and executes analysis of a speaker.

In the information processing apparatus according to the embodiment, the information processing apparatus is an imaging apparatus, the information processing apparatus further includes a shutter control unit that is inputted with a line-of-sight discrimination result in the line-of-sight discriminating unit and executes shutter control for the imaging apparatus, and the shutter control unit performs control for disabling shutter operation when a face image in the negative state in which a line of sight is not directed in a camera direction is included in a line of sight of a face included in an acquired image of the imaging apparatus.

In the information processing apparatus according to the embodiment, the information processing apparatus further includes a frame selecting unit that is inputted with a line-of-sight discrimination result corresponding to plural image frames discriminated by the line-of-sight discriminating unit and performs selection processing for the image data, and the frame selecting unit applies respective kinds of state information of the positive state and the negative state and performs selection of an image frame.

In the information processing apparatus according to the embodiment, the information processing apparatus is an imaging apparatus, the information processing apparatus further includes a warning output unit that is inputted with a line-of-sight discrimination result in the line-of-sight discriminating unit and executes warning output, and the warning output unit performs the warning output when a face image in the negative state in which a line of sight is not directed in a camera direction is included in a line of sight of a face included in an acquired image of the imaging apparatus.

In the information processing apparatus according to the embodiment, the information processing apparatus applies a line-of-sight discrimination result of the line-of-sight discriminating unit to data retrieval processing and executes retrieval processing for selecting and extracting an image in the positive state in which a line of sight is directed in a camera direction or the negative state in which a line of sight is not directed in a camera direction.

In the information processing apparatus according to the embodiment, the information processing apparatus performs processing for storing a line-of-sight discrimination processing result of the image data in a storing unit as correspondence information of the image data stored in the storing unit.

According to another embodiment of the present invention, there is provided an information processing method executed in an information processing apparatus, the information processing method including the steps of a face detecting unit detecting a face area included in image data, a face-component detecting unit detecting a face component from the face area detected in the face detecting step, and a line-of-sight discriminating unit executing line-of-sight discrimination processing for a face image from which the face component is detected in the face-component detecting step, wherein the line-of-sight discriminating step is a step of executing processing for discriminating whether a line of sight of the face image data from which the face component is detected is in a positive state in which a line of sight is directed in a camera direction or a negative state in which a line of sight is not directed in a camera direction according to collation processing for a line-of-sight discrimination dictionary in which learning data including classification data corresponding to the respective states are stored and input face image data.

In the information processing method according to the embodiment, the face-component detecting step is a step of detecting eyes, a nose, and a mouth from the face area detected in the face detecting step, and the line-of-sight discriminating step is a step of executing the line-of-sight discrimination processing for the face image data from which the eyes, the nose, and the mouth are detected.

In the information processing method according to the embodiment, the line-of-sight discriminating step is a step of executing the line-of-sight discrimination processing according to processing employing a PixDif algorism that uses a difference value of a pixel pair in a specific position of an image as comparison and collation data.

In the information processing method according to the embodiment, the information processing apparatus further includes the step of an image processing unit executing rotation processing, size normalization processing, and face-area slicing processing for the face image from which the face component is detected in the face-component detecting step, and the line-of-sight discriminating step is a step of inputting the image processed in the image processing step and executing the line-of-sight discrimination processing.

In the information processing method according to the embodiment, the face detecting step is a step of executing, with reference to a face detection dictionary in which various kinds of face area image information are stored, face-area detection processing for a face area included in the image data using a PixDif algorism that uses a difference value of a pixel pair in a specific position of an image as comparison and collation data.

In the information processing method according to the embodiment, the face-component detecting step is a step of executing, with reference to a face component detection dictionary in which various kinds of face component image information are stored, face-component detection processing for detection of a face component from the face area detected in the face detecting step using a PixDif algorism that uses a difference value of a pixel pair in a specific position of an image as comparison and collation data.

In the information processing method according to the embodiment, the information processing method further includes the step of a sound recognizing unit executing sound recognition processing, and a step of a data processing unit combining a line-of-sight discrimination result and a sound recognition result in the sound recognizing unit and executing analysis of a speaker.

In the information processing method according to the embodiment, the information processing apparatus is an imaging apparatus, the information processing method further includes the step of a shutter control unit inputting a line-of-sight discrimination result in the line-of-sight discriminating step and executing shutter control for the imaging apparatus, and the shutter control step is a step of performing control for disabling shutter operation when a face image in the negative state in which a line of sight is not directed in a camera direction is included in a line of sight of a face included in an acquired image of the imaging apparatus.

In the information processing method according to the embodiment, the information processing method further includes the step of a frame selecting unit inputting a line-of-sight discrimination result corresponding to plural image frames discriminated in the line-of-sight discriminating step and performing selection processing for the image data, and the frame selecting step is a step of applying respective kinds of state information of the positive state and the negative state and performing selection of an image frame.

In the information processing method according to the embodiment, the information processing apparatus is an imaging apparatus, the information processing method further includes the step of a warning output unit inputting a line-of-sight discrimination result in the line-of-sight discriminating step and executing warning output, and the warning output step is a step of performing the warning output when a face image in the negative state in which a line of sight is not directed in a camera direction is included in a line of sight of a face included in an acquired image of the imaging apparatus.

In the information processing method according to the embodiment, the information processing method further includes the step of a retrieving unit applying a line-of-sight discrimination result of the line-of-sight discriminating unit to data retrieval processing and executing retrieval processing for selecting and extracting an image in the positive state in which a line of sight is directed in a camera direction or the negative state in which a line of sight is not directed in a camera direction.

In the information processing method according to the embodiment, the information processing method further includes the step of a data processing unit performing processing for storing a line-of-sight discrimination processing result of the image data in a storing unit as correspondence information of the image data stored in the storing unit.

According to still another embodiment of the present invention, there is provided a computer program for casing an information processing apparatus to execute information processing, the computer program including a face detecting step of causing a face detecting unit to detect a face area included in image data, a face-component detecting step of causing a face-component detecting unit to detect a face component from the face area detected in the face detecting step, and a line-of-sight discriminating step of causing a line-of-sight discriminating unit to execute line-of-sight discrimination processing for a face image from which the face component is detected in the face-component detecting step, wherein the line-of-sight discriminating step is a step of causing the line-of-sight discriminating unit to execute processing for discriminating whether a line of sight of the face image data from which the face component is detected is in a positive state in which a line of sight is directed in a camera direction or a negative state in which a line of sight is not directed in a camera direction according to collation processing for a line-of-sight discrimination dictionary in which learning data including classification data corresponding to the respective states are stored and input face image data.

The computer program according to the embodiment of the present invention is, for example, a computer program that can be provided to a general-purpose computer system, which can execute various program codes, by a storage medium or a communication medium provided in a computer readable format. By being provided with the program in a computer readable format, a computer system can implement processing according to the program.

Other objects, characteristics, and advantages of the present invention will be made apparent by more detailed explanation based on an embodiment of the present invention described later and the drawings attached hereto. In this specification, a system is a configuration of a logical set of plural apparatuses and is not limited to a system in which apparatuses having individual configurations are provided in an identical housing.

In an embodiment of the present invention, a face area and face components such as eyes, a nose, and a mouth included in an image are detected. The line-of-sight discriminating unit executes line-of-sight discrimination processing for a face image from which the eyes, the nose, and the mouth are detected. As the line-of-sight discrimination processing, the line-of-sight discriminating unit performs processing for discriminating whether a line of sight of the face image data from which the face component is detected is in a positive state in which a line of sight is directed in a camera direction or a negative state in which a line of sight is not directed in a camera direction using a line-of-sight discrimination dictionary in which learning data including classification data corresponding to the respective states are stored. Specifically, the line-of-sight discriminating unit performs the line-of-sight discrimination processing by applying a PixDif algorism that uses a difference value of a pixel pair in a specific position of an image as comparison and collation data. According to the embodiment, the line-of-sight discrimination is based on clear discrimination of two states, i.e., a state in which a line of sight is directed in a camera direction and a state in which a line of sight is not directed in a camera direction. Therefore, accuracy of the discrimination processing is high and a value of use of a discrimination result is also high.

BRIEF DESCRIPTION OF THE DRAWINGS

FIG. 1 shows diagrams for explaining an overview of processing executed by an information processing apparatus according to an embodiment of the present invention;

FIG. 9 is a flowchart for explaining a processing sequence of the line-of-sight discrimination processing according to the embodiment applied to the imaging apparatus;

FIGS. 11A and 11B are diagrams for explaining a configuration and processing of a moving image data managing apparatus to which the line-of-sight discrimination processing according to the embodiment is applied;

FIG. 13 is a diagram for explaining an example of a hardware configuration of a PC as an example of the information processing apparatus according to the embodiment.

DESCRIPTION OF THE PREFERRED EMBODIMENTS

Details of an information processing apparatus, an information processing method, and a computer program according to embodiments of the present invention are explained below with reference to the accompanying drawings.

First, an overview of processing executed by an information processing apparatus according to an embodiment is explained with reference to FIG. 1. The information processing apparatus according to the embodiment is an information processing apparatus that executes analysis of a photographed image of a camera and executes processing for detecting a line-of-sight direction of eyes of a face of a person, an animal, or the like included in the photographed image. The information processing apparatus discriminates whether a line of sight is directed to a camera and, specifically, discriminates the following two states:

a positive state: a face (including a front face and a profile) with a line of sight directed to a camera; and a negative state: a face with a line of sight not directed to a camera, e.g., a face turned sideways or a face with closed eyes.

The information processing apparatus according to the embodiment discriminates whether a line-of-sight direction of eyes of a face of a person, an animal, or the like included in a photographed image photographed by the camera is in the positive state or the negative state. A specific example is shown in FIG. 1.

(A) in FIG. 1 is an example of the positive state, i.e., the face with a line of sight directed to a camera. (B) in FIG. 1 is an example of the negative state, i.e., the face with a line of sight not directed to a camera.

Figure 2:
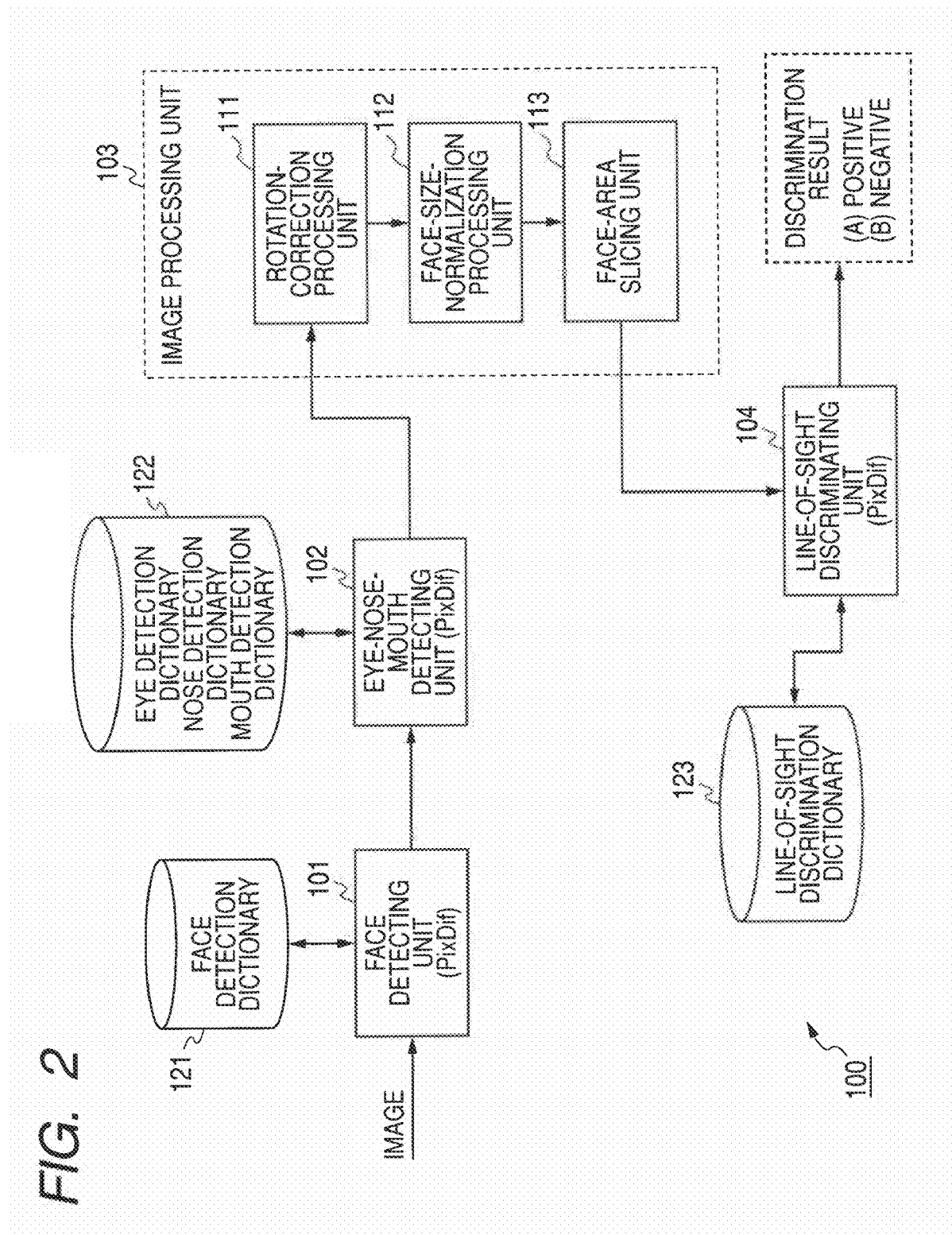
FIG. 2 is a diagram for explaining a configuration and processing of the information processing apparatus according to the embodiment.

A configuration and processing of the information processing apparatus according to the embodiment are explained with reference to FIG. 2 and subsequent figures. FIG. 2 is a diagram showing a configuration of an example of the information processing apparatus according to the embodiment. The information processing apparatus according to the embodiment discriminates, with so-called boosting for combining leaning machines with low performance (weak learners) to output a highly accurate discrimination result, whether a line-of-sight direction of eyes of a face of a person, an animal, or the like included in a photographed image photographed by a camera is in a positive state in which a line of sight is directed to a camera and a negative state in which a line of sight is not directed to a camera.

An information processing apparatus 100 shown in FIG. 2 includes a face detecting unit 101, an eye-nose-mouth detecting unit 102, an image processing unit 103, and a line-of-sight discriminating unit 104. The image processing unit 103 includes a rotation-correction processing unit 111, a face-size-normalization processing unit 112, and a face-area slicing unit 113. The information processing apparatus 100 also includes a face detection dictionary 121 used in face detection processing in the face detecting unit 101, an eye-nose-mouth detection dictionary 122 used in eye-nose-mouth detection processing in the eye-nose-mouth detecting unit 102, and a line-of-sight discrimination dictionary 123 used for line-of-sight discrimination processing in the line-of-sight discriminating unit 104.

In the information processing apparatus 100 shown in FIG. 2, learning machines with low performance (weak learners) of boosting are used in the face detecting unit 101, the eye-nose-mouth detecting unit 102, and the line-of-sight discriminating unit 104. These processing units perform processing employing a PixDif algorithm that uses a difference value of a pixel pair in a specific position of an image obtained in learning as comparison and collation data. Details of this algorithm are disclosed in, for example, JP-A-2005-284348.

When an image as an object of line-of-sight discrimination processing is inputted, first, the face detecting unit 101 detects whether a face is in an input image frame. This face detection processing is performed by using the face detection dictionary 121. As described above, the face detection processing is executed as processing employing learning machines with low performance (weak learners) of boosting and is executed by the processing employing the PixDif algorithm that uses a difference value of a pixel pair in a specific position of an image obtained by learning as comparison and collation data. In other words, the face detecting unit 101 executes, with reference to the face detection dictionary 121 in which various kinds of face area image information are stored, face-area detection processing for a face area included in image data using the PixDif algorithm that uses a difference value of a pixel pair in a specific position of an image as comparison and collation data.

A learning result of face detection by the PixDif algorithm that uses a difference value of a pixel pair in a specific position of an image as comparison and collation data is stored in the face detection dictionary 121. The face detecting unit 101 judges whether a face is in an input image frame according to collation of difference value data of a pixel pair in a specific position of the input image and data of the face detection dictionary 121 in which the learning result is stored.

Face detection information detected by the face detecting unit 101 is inputted to the eye-nose-mouth detecting unit 102 as a face-component detecting unit together with an image. The eye-nose-mouth detecting unit 102 performs processing for detecting face components, i.e., eyes, a nose, and a mouth in the face detected by the face detecting unit 101. This eye-nose-mouth detection processing is executed, by using a face-component detection dictionary, i.e., the eye-nose-mouth detection dictionary 122, as processing employing learning machines with low performance (weak learners) of boosting and executed by the processing employing the PixDif algorithm that uses a difference value of a pixel pair in a specific position of an image obtained by learning as comparison and collation data. In other words, the eye-nose-mouth detecting unit 102 as the face-component detecting unit executes, with reference to the face-component detection dictionary in which various kinds of face component image information are stored, i.e., the eye-nose-mouth detection dictionary 122, face-component detection processing for detection of face components from the face area detected by the face detecting unit 101 using the PixDif algorithm that uses a difference value of a pixel pair in a specific position of an image as comparison and collation data.

A learning result of eye-nose-mouth detection by the PixDif algorithm that uses a difference value of a pixel pair in a specific position of an image as comparison and collation data is stored in the eye-nose-mouth detection dictionary 122. The eye-nose-mouth detecting unit 102 executes detection processing for eyes, a nose, and a mouth in the face detected by the face detecting unit 101 according to collation of difference value data of a pixel pair in a specific position of the input image and data of the eye-nose-mouth detection dictionary 122 in which the learning result is stored.

In the eye-nose-mouth detection processing in the eye-nose-mouth detecting unit 102, a face, not all of eyes, a nose, and a mouth of which are detected, is removed from processing objects and the line-of-sight discrimination for the face is not performed. Only a face, all of eyes, a nose, and a mouth of which are detected, is selected as a face of a line-of-sight discrimination object and positional relation information of the eyes, the nose, and the mouth is acquired from the face.

Image data is inputted to the image processing unit 103 together with selection information of the face, all of the eyes, the nose, and the mouth of which are detected, and the positional relation information of the eyes, the nose, and the mouth. The rotation-correction processing unit 111 of the image processing unit 103 performs image rotation correction for a face area judged as the line-of-sight discrimination object using a positional relation among the eyes, the nose, and the mouth. In other words, the rotation-correction processing unit 111 performs processing for erecting a tilting face.

The image data subjected to rotation correction is inputted to the face-size-normalization processing unit 112. The face-size-normalization processing unit 112 executes, using distance information of the eyes, the nose, and the mouth, expansion and reduction of an image size to make a size of a face portion equal to a standard size set in advance and performs size normalization processing.

An image subjected to the normalization processing is inputted to the face-area slicing unit 113 and processing for slicing a face image area portion is executed. This sliced image is outputted to the line-of-sight discriminating unit 104.

The line-of-sight discriminating unit 104 performs line-of-sight discrimination processing for a face included in the sliced image. This line-of-sight discrimination processing is executed, by using the line-of-sight discrimination dictionary 123, as processing employing learning machines with low performance (weak learners) of boosting and is executed by the processing employing the PixDif algorithm that uses a difference value of a pixel pair in a specific position of an image obtained by learning as comparison and collation data.

In the line-of-sight discrimination dictionary 123, learning data including classification data corresponding to the positive state in which a line of sight is directed in a camera direction and the negative state in which a line of sight is not directed in a camera direction, i.e., a learning result of line-of-sight discrimination is stored. The line-of-sight discriminating unit 104 executes line-of-sight discrimination processing according to collation of difference value data of a pixel pair in a specific position of the input image and data of the line-of-sight discrimination dictionary 123 in which the learning result is stored.

The line-of-sight discriminating unit 104 discriminates, as the line-of-sight discrimination processing for the face included in the sliced image, whether a line-of-sight direction of eyes of a face of a person, an animal, or the like included in the image is in the positive state in which a line of sight is directed to a camera or the negative state in which a line of sight is not directed to a camera according to the processing employing the PixDif algorithm that uses a difference value of a pixel pair in a specific position of an image obtained in learning as comparison and collation data and outputs a discrimination result.

Learning data classified into two classes of the positive state and the negative state is stored in the line-of-sight discrimination dictionary 123 in which the learning result is stored. The line-of-sight discriminating unit 104 executes line-of-sight discrimination according to collation with data of the line-of-sight discrimination dictionary 123 in which the learning result is stored.

When plural faces are included in an input image, after processing for one face is finished, the same processing is repeated for the next face. Finally, the processing for all the faces detected in the image is executed and the processing is finished.

The three dictionaries shown in FIG. 2, i.e., the face detection dictionary 121 used for the face detection processing in the face detecting unit 101, the eye-nose-mouth detection dictionary 122 used for the eye-nose-mouth detection processing in the eye-nose-mouth detecting unit 102, and the line-of-sight discrimination dictionary 123 used for the line-of-sight discrimination processing in the line-of-sight discriminating unit 104 are appropriately used according to an object subjected to line-of-sight discrimination. For example, when human line-of-sight discrimination is executed, a dictionary for humans is used. A dictionary for cats is used for a cat and a dictionary for dogs is used for a dog.

As described above, the line-of-sight discriminating unit 104 discriminates, as the line-of-sight discrimination processing for the face included in the sliced image, whether a line-of-sight direction of eyes of a face of a person, an animal, or the like included in the image is in the positive state in which a line of sight is directed to a camera or the negative state in which a line of sight is not directed to a camera according to the processing employing the PixDif algorithm that uses a difference value of a pixel pair in a specific position of an image obtained in learning as comparison and collation data. When this processing is executed, if the processing is performed for an entire face image, processing time is long. Therefore, it is preferable to perform processing for limiting a processing range such as limiting an application range of processing employing the PixDif algorithm that uses a difference value of a pixel pair as comparison and collation data to an area of eyes.

For example, as shown in FIGS. 3A to 3D, it is possible to make the processing efficient by using masks for selecting a pixel pair set as a processing object. Examples of plural kinds of masks described below are shown in FIGS. 3A to 3D.

Figure 3A:
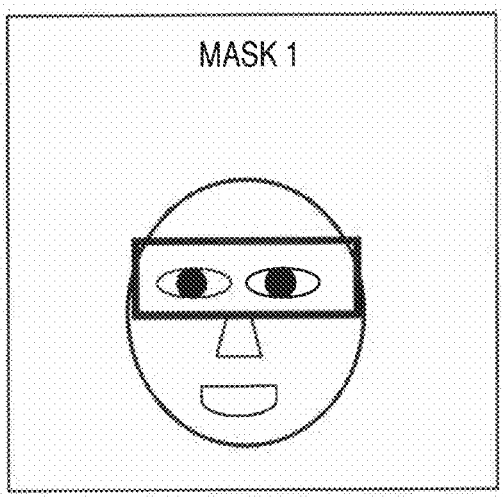
FIGS. 3A to 3D are diagrams for explaining examples of mask setting applicable in the information processing apparatus according to the embodiment.
Figure 3B:
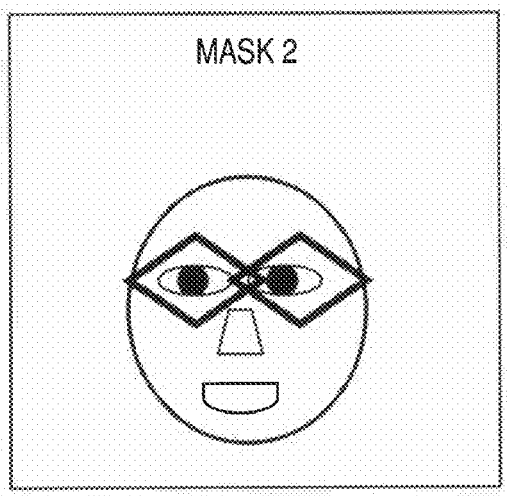
Figure 3C:
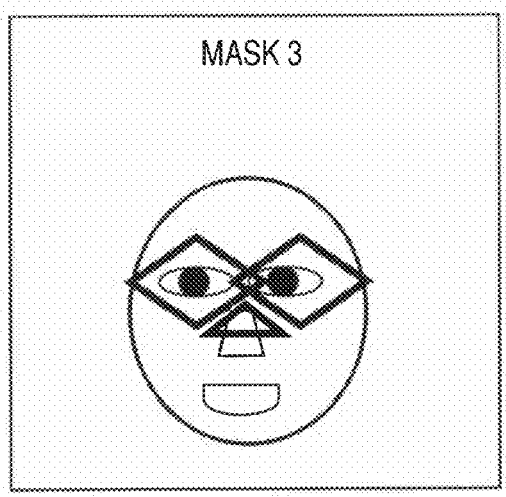
Figure 3D:
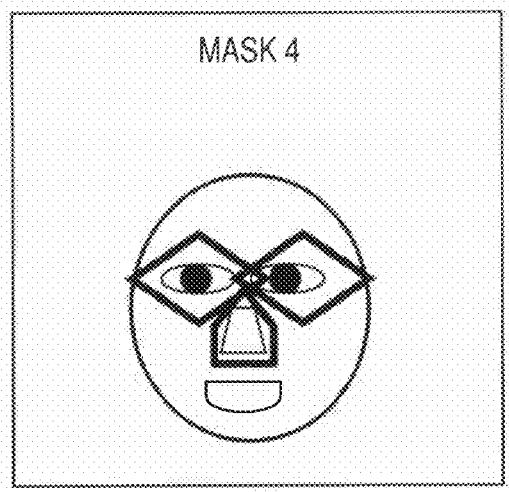

FIG. 3A: A mask for setting a rectangular area including both eyes as a processing object area FIG. 3B: A mask for setting individual areas of the respective eyes as processing object areas FIG. 3C: A mask for setting the respective eyes and an upper area of a nose as processing object areas FIG. 3D: A mask for setting the respective eyes and the entire nose as processing object area It is possible to efficiently generate a learning result and perform discrimination processing by setting these masks and limiting a processing area.

Figure 4:
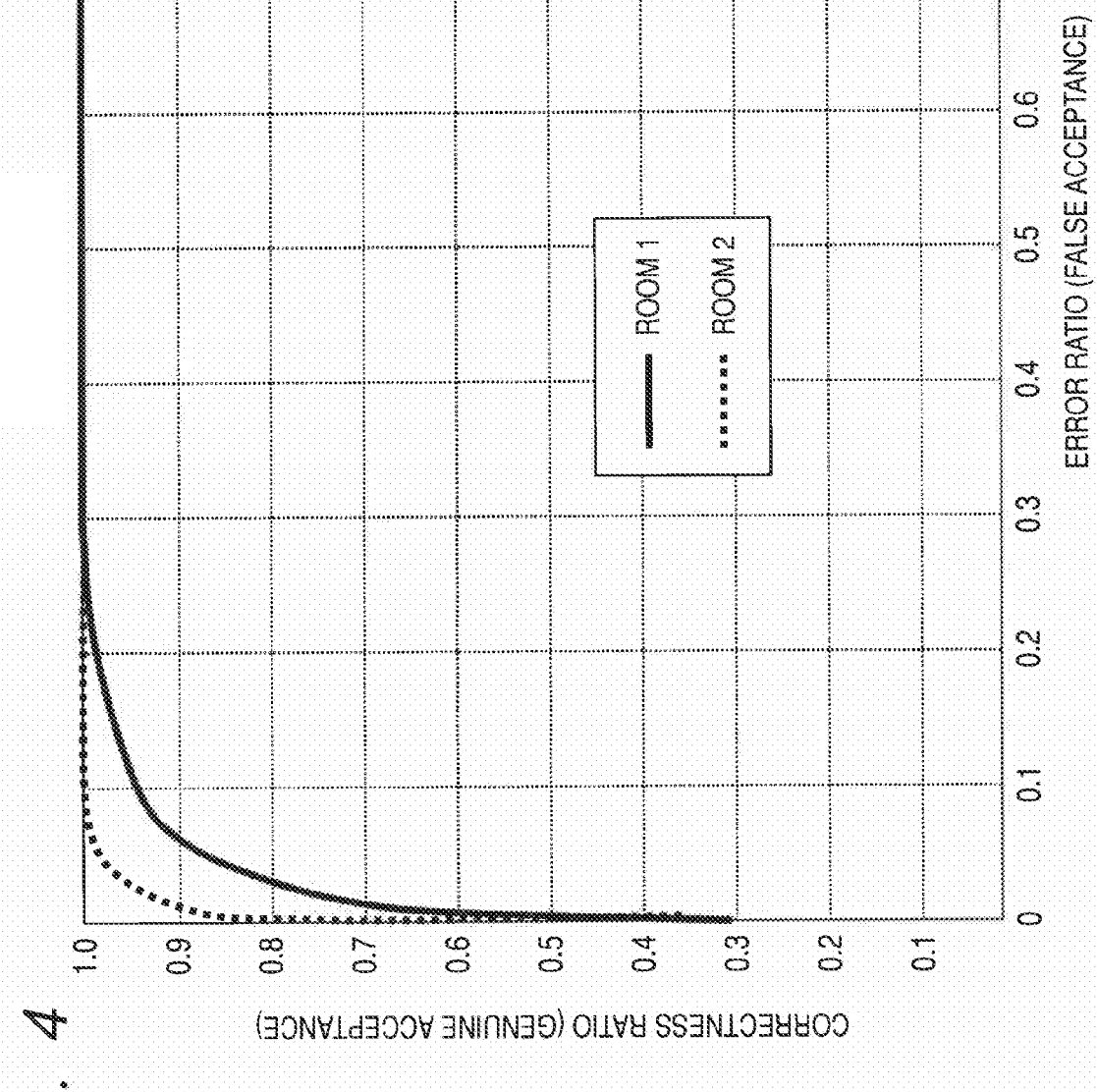
FIG. 4 is a graph for explaining evaluation data of a result of line-of-sight discrimination executed in the information processing apparatus according to the embodiment.

Performance evaluation data of the line-of-sight discrimination result in the information processing apparatus explained with reference to FIG. 2 is shown in FIG. 4. A subject (a photographing user) set a direction of a face in a range of −5 degrees to +5 degrees from a front direction with respect to a camera, directed a line of sight in various directions, and executed the line-of-sight discrimination using the information processing apparatus shown in FIG. 2.

FIG. 4 is a graph showing experiment results in different rooms (rooms 1 and 2) as ROC curves. The ordinate of the graph corresponds to an error ratio of a discrimination result and the abscissa corresponds to a correctness ratio. In the line-of-sight discrimination, it was discriminated whether the line of sight was in the positive state in which a line of sight is directed to a camera and the negative state in which a line of sight is not directed to a camera. Most of experiment results were correct.

Figure 5:
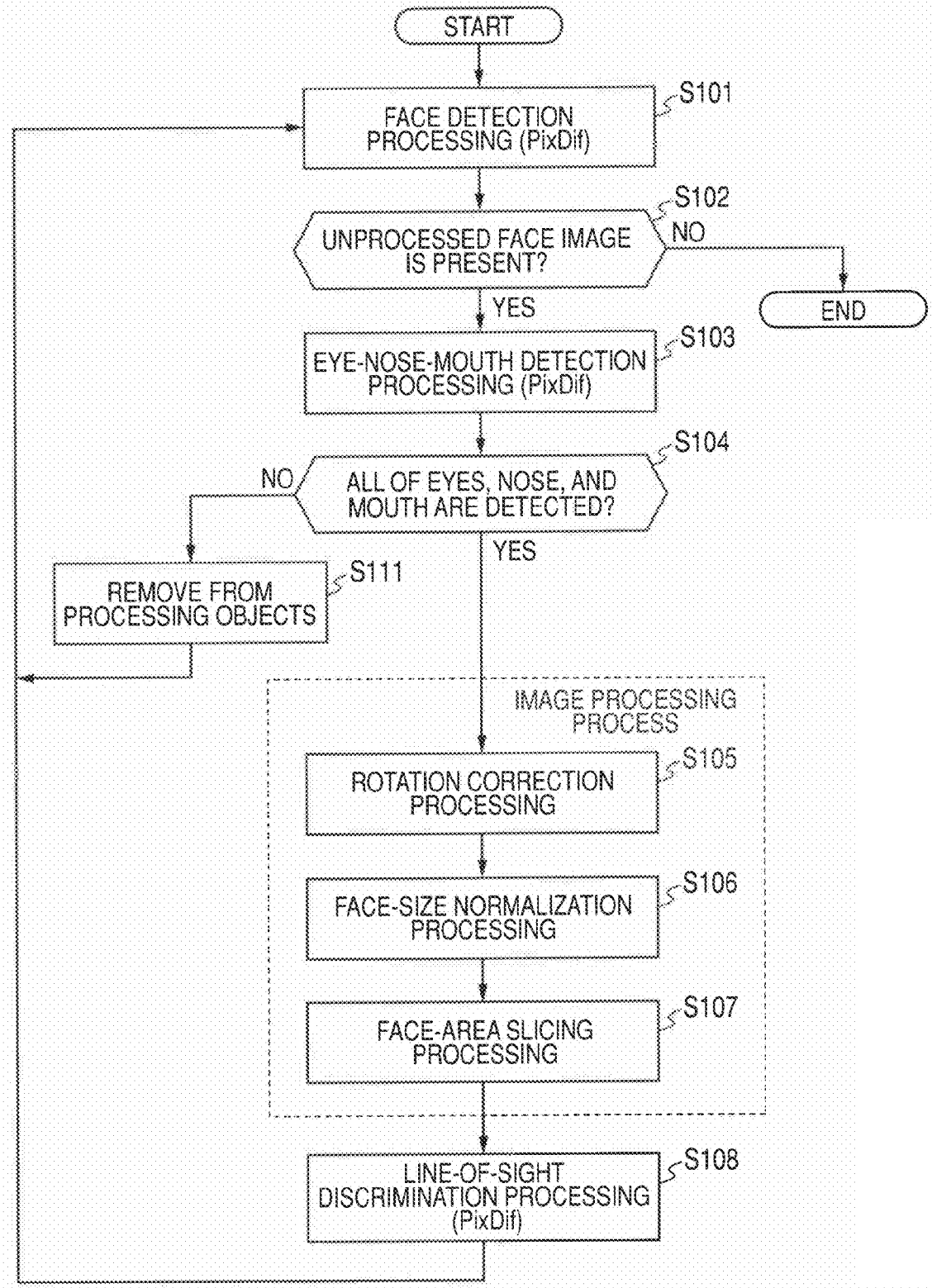
FIG. 5 is a flowchart for explaining a sequence of line-of-sight discrimination processing executed in the information processing apparatus according to the embodiment.

A sequence of the line-of-sight discrimination processing to which the information processing apparatus shown in FIG. 2 is applied is explained with reference to a flowchart shown in FIG. 5. When an image as an object of the line-of-sight discrimination processing is inputted, first, in step S101, face detection processing for detecting whether a face is in an input image frame is performed. This processing is executed as processing by the face detecting unit 101 of the information processing apparatus shown in FIG. 2. As described above, the face detecting unit 101 executes, using the face detection dictionary 121, the processing for detecting whether a face is in the input image frame according to the processing employing the PixDif algorithm that uses a difference value of a pixel pair as comparison and collation data.

In step S102, presence of absence of an unprocessed image is discriminated and, when there is no unprocessed image, the processing is finished. When there is an unprocessed image, the information processing apparatus proceeds to step S103. In step S103, the eye-nose-mouth detection processing is executed. This processing is executed as processing by the eye-nose-mouth detecting unit 102 of the information processing apparatus shown in FIG. 2. The eye-nose-mouth detecting unit 102 executes, using the eye-nose-mouth detection dictionary 122, the eye-nose-mouth detection processing for the face detected by the face detecting unit 101 according to the processing employing the PixDif algorithm that uses a difference value of a pixel pair in a specific position of an image as comparison and collation data.

In step S104, it is judged whether all of eyes, a nose, and a mouth are detected in the eye-nose-mouth detection processing. As described above, a face, not all of eyes, a nose, and a mouth of which are not detected, is removed from processing objects in the eye-nose-mouth detection processing in the eye-nose-mouth detecting unit 102 and line-of-sight discrimination is not performed. In other words, the information processing apparatus proceeds to step S111 and the face is removed from the processing objects. The information processing apparatus proceeds to step S101 and performs the processing for the next face.

Processing in step S105 and subsequent steps is executed only for a face, all of eyes, a nose, and a mouth of which are detected. The processing in steps S105 to S107 is processing of the image processing unit 103 shown in FIG. 2. First, in step S105, the rotation-correction processing unit 111 of the image processing unit 103 applies image rotation correction to a face area set as a line-of-sight discrimination object using a positional relation among the eyes, the nose, and the mouth. In other words, the rotation-correction processing unit 111 performs processing for erecting a tilting face.

In step S106, the face-size normalization processing unit 112 performs, using distance information of the eyes, the nose, and the mouth, size normalization processing by expansion and reduction of an image size to make a size of a face portion equal to a standard size set in advance. In step S107, the face-area slicing unit 113 executes processing for slicing a face image area portion from an image subjected to the normalization processing.

In step S108, line-of-sight discrimination processing is executed. This processing is processing by the line-of-sight discriminating unit 104 of the information processing apparatus shown in FIG. 2. The line-of-sight discriminating unit 104 executes, using the line-of-sight discrimination dictionary 123, the line-of-sight discrimination processing for a face included in a sliced image according to the processing employing the PixDif algorithm that uses a difference value of a pixel pair in a specific position of an image obtained by learning. The line-of-sight discriminating unit 104 discriminates, as the line-of-sight discrimination processing for the face included in the sliced image, whether a line-of-sight direction of eyes of a face of a person, an animal, or the like included in the image is in the positive state in which a line of sight is directed to a camera or the negative state in which a line of sight is not directed to a camera. When this line-of-sight discrimination processing is finished for one face image, the information processing apparatus returns to step S101 and shifts to processing of the next face image. When it is judged in step S102 that there is no unprocessed image, the processing is finished.

In the information processing apparatus according to this embodiment, the processing by the line-of-sight discriminating unit 104 of the information processing apparatus shown in FIG. 2 is extremely clear two-state discrimination processing for discriminating whether a line-of-sight direction of eyes of a face of a person, an animal, or the like included in an image is the positive state in which a line of sight is directed to a camera or the negative state in which a line of sight is not directed to a camera. This two-state discrimination processing is executed by using the line-of-sight discrimination dictionary 123 acquired as learning data by using the PixDif algorithm that uses a difference value of a pixel pair in a specific position as comparison and collation data. It is possible to perform accurate line-of-sight discrimination by applying a dictionary generated from a larger number of learning data. More accurate discrimination is realized by properly using the line-of-sight discrimination dictionary according to a line-of-sight discrimination object. For example, when human line-of-sight discrimination is executed, a dictionary for humans is used. A dictionary for cats is used for a cat and a dictionary for dogs is used for a dog.

Plural examples of a specific data processing application employing the information processing apparatus shown in FIG. 2 are explained with reference to FIG. 6 and subsequent figures. Processing explained below are the following four kinds of processing (a) to (d):

(a) an example of use in an image and sound recognition system;

(b) an example of use A in an imaging apparatus;

(c) an example of use in an image data managing system; and (d) an example of use B in the imaging apparatus.

As these kinds of processing, (a) and (c) are executed in information processing apparatuses such as a PC and (b) and (d) are executed in imaging apparatuses such as a still camera and a video camera. Processing sequences of these kinds of processing are explained below.

(a) An Example of Use in an Image and Sound Recognition System

An example of use in which the line-of-sight discrimination processing described above is applied to an image and sound recognition system is explained with reference to a flowchart shown in FIG. 6. A flow shown in FIG. 6 is executed in an information processing apparatus such as a PC. A processing sequence shown in FIG. 6 and a program for executing the line-of-sight discrimination processing explained with reference to FIG. 5 above are stored in the storing unit of the information processing apparatus. The processing sequence shown in FIG. 6 and the line-of-sight discrimination processing explained with reference to FIG. 5 above are executed by the control unit configured by a CPU or the like.

Figure 6:
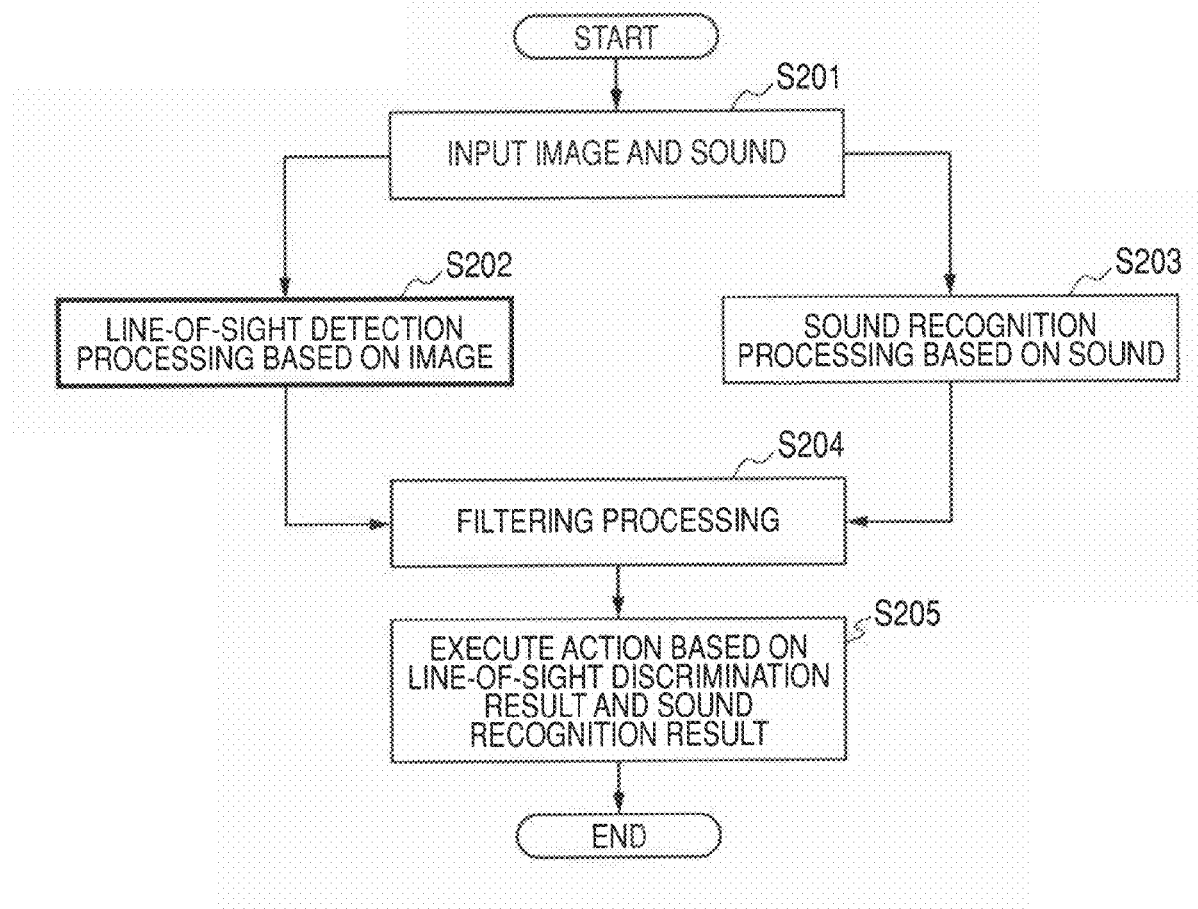
FIG. 6 is a flowchart for explaining a processing sequence of the line-of-sight discrimination processing according to the embodiment applied to an image and sound recognition system.

The information processing apparatus that executes the processing shown in FIG. 6 includes a sound recognizing unit that executes sound recognition processing. The information processing apparatus combines a line-of-sight discrimination result and a sound recognition result in the sound recognizing unit and executes analysis of a speaker. Processing in respective steps in the flow shown in FIG. 6 is explained.

In step S201 of the flow shown in FIG. 6, an image and sound information are inputted. The image is inputted to the information processing apparatus via a camera and the sound is inputted to the information processing apparatus via a microphone.

In step S202, the information processing apparatus executes line-of-sight discrimination processing for the inputted image. The information processing apparatus executes the line-of-sight discrimination processing according to processing to which the processing configuration shown in FIG. 2 is applied, specifically, the flowchart shown in FIG. 5. A result of this line-of-sight discrimination processing is a result of discrimination concerning whether a line of sight of a face included in the inputted image is in the positive state in which a line of sight is directed to a camera or the negative state in which a line of sight is not directed to a camera.

In conjunction with the line-of-sight discrimination processing based on the image, in step S230, the information processing apparatus executes sound recognition processing based on the inputted sound information. This sound recognition processing may be processing to which the existing sound recognition technique is applied.

In step S204, the information processing apparatus executes filtering processing using a line-of-sight discrimination result based on the image and a sound recognition result based on the sound. Specifically, for example, in specifying a person who utters words of the sound recognition result, the information processing apparatus executes, for example, processing for specifying a person who is looking at a camera direction as a speaker using the line-of-sight discrimination result based on the image.

In step S205, the information processing apparatus determines the next action and executes the determined action on the basis of a filtering processing result obtained by using the line-of-sight discrimination result and the sound recognition result based on the sound. For example, the information processing apparatus executes processing for, for example, zooming up the camera to the speaker. Alternatively, the information processing apparatus can perform, in recording speech, processing for recording identification information of the speaker as metadata.

In general, in the sound recognition processing, recognition errors often occur. For example, when people are making noise around the camera or various kinds of noise are present, even if the user does not utter a word, sound recognition is automatically performed and a command (e.g., a command for camera control or data recording) is often inputted. This is a significant problem in the interactive system. When a system adapted to execute the line-of-sight discrimination processing in conjunction with the sound recognition and receiving a command only when a line of sight is directed to a camera is used, the system can eliminate execution of unnecessary wrong commands and can execute sure processing. In particular, in a noisy place such as a party and a live concert hall, it is natural to speak without taking eyes off each other not to hear words wrong. It is also a natural action to simulatively "gaze at" the camera when the user utters a command in the interactive system. Therefore, it is possible to perform natural processing without inflicting pain on the user.

(b) An Example of Use A in an Imaging Apparatus

Figure 7:
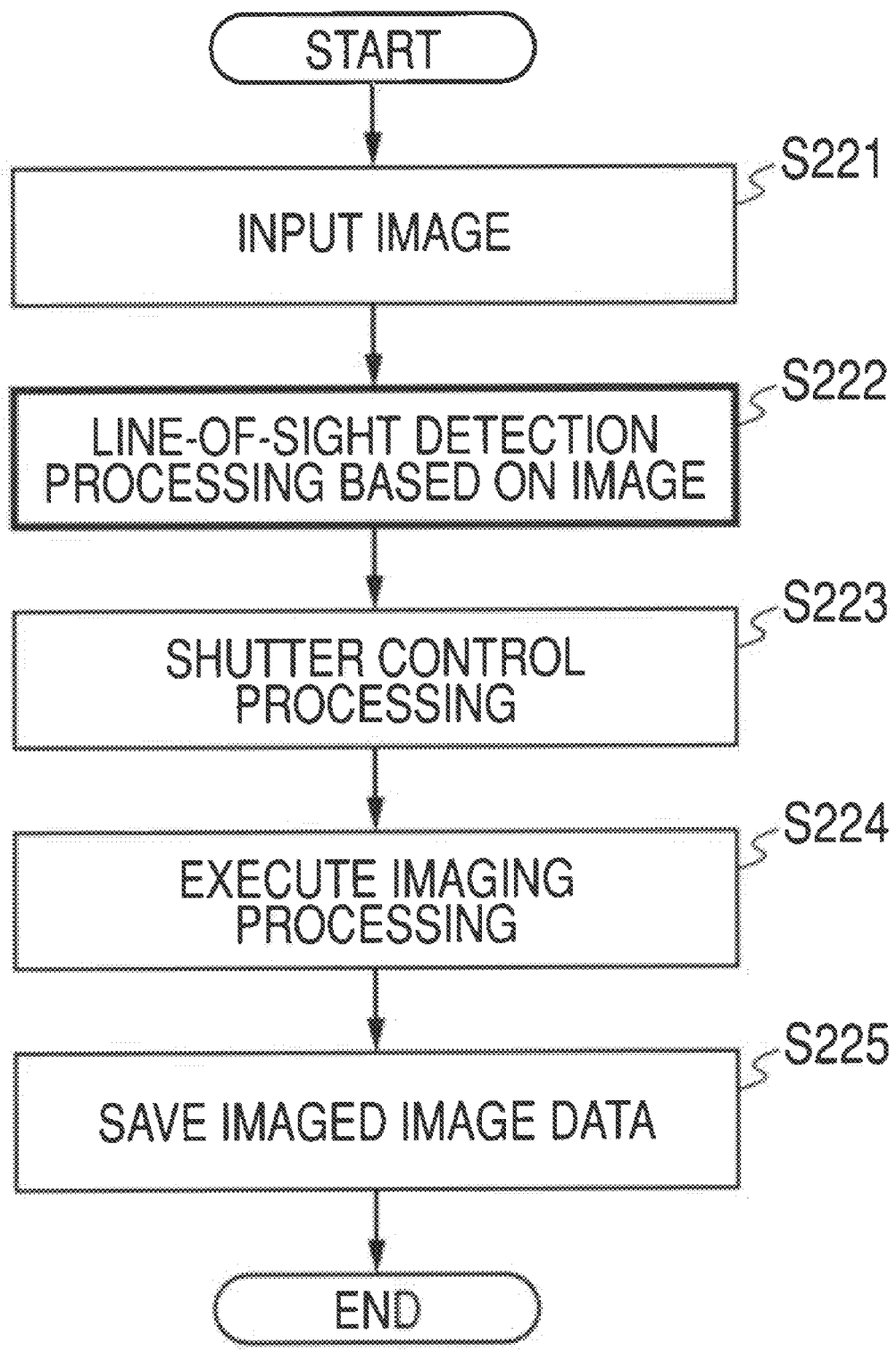
FIG. 7 is a flowchart for explaining a processing sequence of the line-of-sight discrimination processing according to the embodiment applied to an imaging apparatus.

An example of processing in which the line-of-sight discrimination processing described above is used in an imaging apparatus is explained with reference to a flowchart shown in FIG. 7. A flow shown in FIG. 7 is executed in an imaging apparatus such as a digital still camera. A program for executing a processing sequence shown in FIG. 7 and the line-of-sight discrimination processing explained with reference to FIG. 5 above is stored in the storing unit of the imaging apparatus. The processing sequence shown in FIG. 7 and the line-of-sight discrimination processing explained with reference to FIG. 5 above are executed by the control unit configured by a CPU or the like.

The information processing apparatus that executes processing according to the flow shown in FIG. 7 is an imaging apparatus. The information processing apparatus includes a shutter control unit that is inputted with a line-of-sight discrimination result in the line-of-sight discriminating unit and executes shutter control for the imaging apparatus. The shutter control unit performs control for disabling shutter operation when a face image in the negative state in which a line of sight is not directed in a camera direction is included in a line of sight of a face included in an acquired image of the imaging apparatus. Processing in respective steps of a flow shown in FIG. 7 is explained.

In step S221 of the flow shown in FIG. 7, an image is inputted. The image is inputted from an imaging unit of a camera. In step S222, line-of-sight discrimination processing for the inputted image is executed. The line-of-sight discrimination processing is executed according to the processing to which the processing configuration shown in FIG. 2 is applied, specifically, the flowchart shown in FIG. 5. A result of this line-of-sight discrimination processing is a result of discrimination concerning whether a line of sight of a face included in the inputted image is in the positive state in which a line of sight is directed to a camera or the negative state in which a line of sight is not directed to a camera.

In step S223, shutter control processing based on a line-of-sight discrimination result acquired in step S222 is executed. For example, the shutter control unit performs control for setting shutter operation possible when the line of sight of the face included in the image is directed in a camera direction (the positive state) and setting shutter operation impossible when the line of sight of the face included in the image is not directed in the camera direction (the negative state). With this control, a photographer can discriminate a line-of-sight state of a subject according to the possibility of the shutter operation and prevent himself/herself from photographing a face not looking at the camera by mistake.

When the line of sight of the face included in the image is directed in the camera direction (the positive state), the shutter operation is possible. Photographing processing is executed in step S224 and photographed image data is stored in the storing unit in step S225.

When a person such as a baby or a pet that does not easily look at the camera even when the photographer wishes to take a picture is photographed, the photographer is often forced to place one hand on a shutter switch while attracting the person's or the pet's attention with the other hand and waits for a chance for a good shot. However, it is often difficult to attract attention with one hand. Although the photographer sometimes performs photographing with both the hands set free using a timer function, a chance for a good shot of the baby is short. Therefore, the photographer often misses such a chance. However, by performing the line-of-sight discrimination described above, the photographer can take a picture while confirming a "good face" of a subject who looks at the camera.

(C) An Example of Use in an Image Data Managing System

Figure 8:
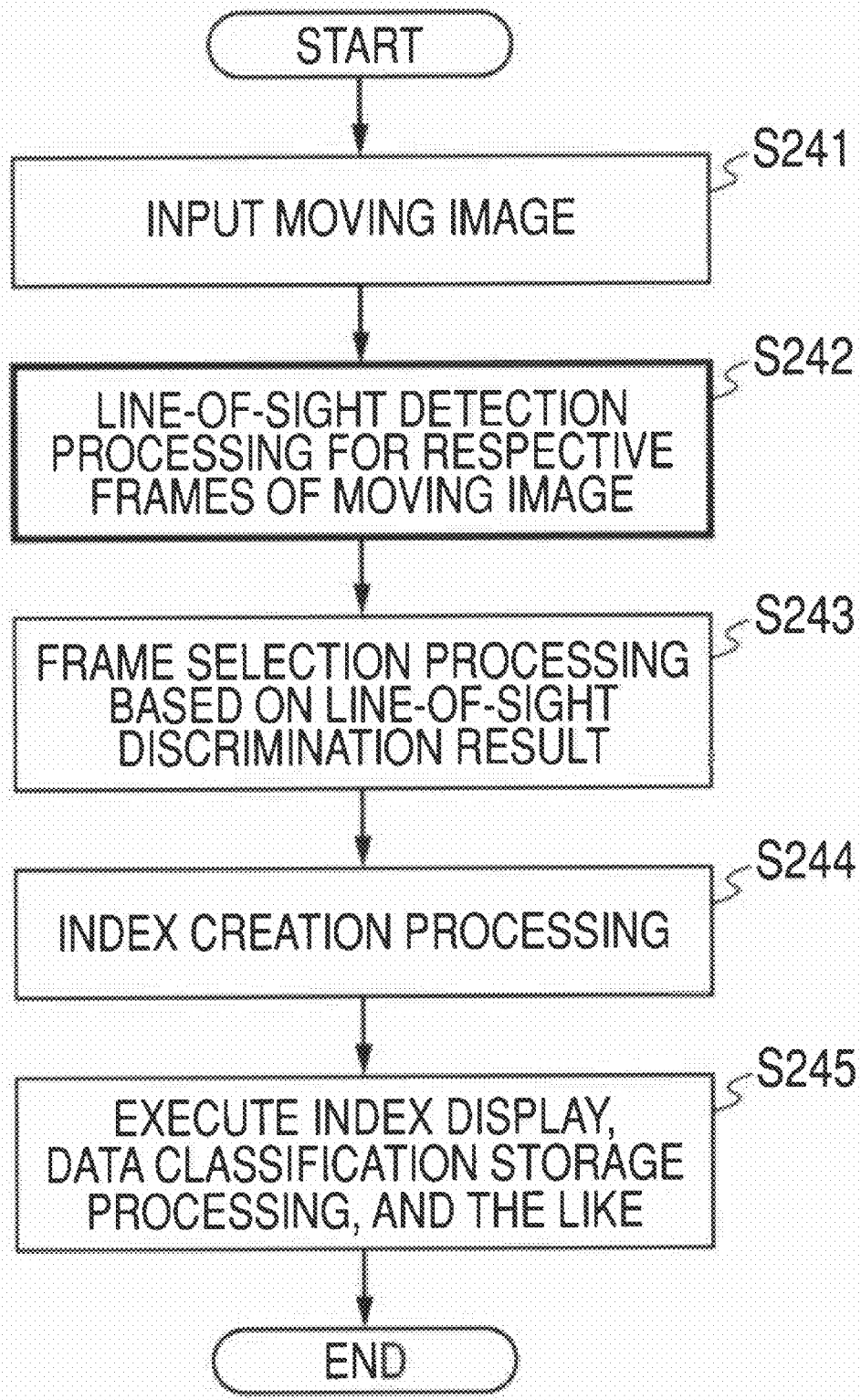
FIG. 8 is a flowchart for explaining a processing sequence of the line-of-sight discrimination processing according to the embodiment applied to an image data managing system.

An example of use in which the line-of-sight discrimination processing described above is applied to an image data managing system is explained with reference to a flowchart shown in FIG. 8. A flow shown in FIG. 8 is executed in an information processing apparatus such as a PC. A processing sequence shown in FIG. 8 and a program for executing the line-of-sight discrimination processing explained with reference to FIG. 5 above are stored in the storing unit of the information processing apparatus. The processing sequence shown in FIG. 8 and the line-of-sight discrimination processing explained with reference to FIG. 5 above are executed by the control unit configured by a CPU or the like.

In the information processing apparatus that executes processing according to the flow shown in FIG. 8 has a frame selecting unit that is inputted with a line-of-sight discrimination result corresponding to plural image frames discriminated by the line-of-sight discriminating unit and performs selection processing for image data. The frame selecting unit selects an image frame by applying the respective kinds of state information of the positive state and the negative state. Processing in respective steps of the flow shown in FIG. 8 is explained.

In step S241 of the flow shown in FIG. 8, a moving image is inputted. The moving image is, for example, moving image data stored in the storing unit of the information processing apparatus.

In step S242, line-of-sight discrimination processing for respective frame images forming the inputted moving image is executed. The line-of-sight discrimination processing is executed according to the processing to which the processing configuration shown in FIG. 2 is applied, specifically, the flowchart shown in FIG. 5. As a result of this line-of-sight discrimination result, a result of discrimination concerning whether a line of sight of a face included in the inputted moving image is in the positive state in which a line of sight is directed to a camera or the negative state in which a line of sight is not directed to a camera is acquired as information corresponding to the respective image frames.

In step S243, selection processing for an image frame to which a line-of-sight discrimination result corresponding to the respective image frames is applied is executed. For example, processing for classifying the image frames into a frame including a face image in the positive state, a frame including only a face image in the negative state, and a frame not including a face image is executed.

In step S244, the frames classified in step S243 are set as indexes, for example, image frames for display of thumbnail images. In step S245, display of index information (thumbnail information), classification storage processing for data based on classification information, and the like are performed.

For example, many kinds of moving image editing software have a function of displaying thumbnail images corresponding to respective scenes and facilitating editing. As a method of creating thumbnails, there are a method of using first frames of divided scenes and a method of extracting several frames at fixed frame intervals and connecting the frames. However, contents of the scenes are not easily understood when the first frames of the scenes and sliced images are used as thumbnails. Therefore, the thumbnails make no sense. In such a case, it is possible to select an image of a person or a pet in a picture looking in a camera direction and extract a "frame of a good face" looking at the camera as an index image. Consequently, simple index extraction is realized and efficiency of moving image editing can be improved.

(d) An Example of Use B in the Imaging Apparatus

An example of processing in which the line-of-sight-discrimination processing described above is used in the imaging apparatus is explained with reference to a flowchart shown in FIG. 9. A flow shown in FIG. 9 is executed in the imaging apparatus such as a digital still camera. A program for executing a processing sequence shown in FIG. 9 and the line-of-sight discrimination processing explained with reference to FIG. 5 above is stored in the storing unit of the imaging apparatus. The processing sequence shown in FIG. 9 and the line-of-sight discrimination processing explained with reference to FIG. 5 above are executed by the control unit configured by a CPU or the like.

The information processing apparatus that executes processing according to the flow shown in FIG. 9 is the imaging apparatus. The information processing apparatus has a warning output unit that is inputted with a line-of-sight discrimination result in the line-of-sight discriminating unit and executes warning output. The warning output unit performs warning output when a face image in the negative state in which a line of sight is not directed in a camera direction is included in a line of sight of a face included in an acquired image of the imaging apparatus. Processing in respective steps of the flow shown in FIG. 9 is explained.

In step S261 of the flow shown in FIG. 9, an image is inputted. The image is inputted from an imaging unit of a camera. In step S262, line-of-sight discrimination processing for the inputted image is executed. The line-of-sight discrimination processing is executed according to the processing to which the processing configuration shown in FIG. 2 is applied, specifically, the flowchart shown in FIG. 5. A result of this line-of-sight discrimination processing is a result of discrimination concerning whether a line of sight of a face included in the inputted image is in the positive state in which a line of sight is directed to a camera or the negative state in which a line of sight is not directed to a camera.

In step S263, processing for discriminating whether all lines of sight of faces of people and the like included in the inputted image are directed in a camera direction is executed on the basis of the line-of-sight discrimination result acquired in step S262. When all the lines of sight of the faces of the people and the like included in the inputted image are directed in the camera direction, a result of judgment in step S264 is Yes. The processing is finished and the next operation, for example, photographing processing is executed.

On the other hand, when all the lines of sight of the faces of the people and the like included in the inputted image are not directed in the camera direction, a result of judgment in step S264 is No. The processing proceeds to step S265 and output of a warning is performed. For example, output of warning sound and display processing for a warning message are performed. According to this warning, the photographer can discriminate a line-of-sight state of a subject before the photographing processing and can prevent himself/herself from photographing a face not looking at the camera by mistake.

For example, immediately after taking a group picture in an important event, the photographer may wish to check whether the group picture is a failure. The photographer can prevent himself/herself from photographing a face not looking at the camera by mistake by using the line-of sight discrimination result according to the flow shown in FIG. 9. In the group picture, people at left and right ends often look sideways. Therefore, it is insufficient to perform only face direction detection. What the photographer desires to know is "whether all the people are looking at the camera. In the information processing apparatus according to this embodiment, rather than performing line-of-sight discrimination on the basis of a direction of a face, it is discriminated on the basis of learning data whether a line of sight of a face included in the inputted image is in either of two states of the positive state in which a line of sight is directed to a camera or the negative state in which a line of sight is not directed to a camera. It is possible to perform the line-of-sight discrimination processing and display a warning icon or the like on a monitor or the like on the basis of an acquired image of the camera. When many faces are displayed on the monitor, it is also possible to perform processing for displaying, in association with the respective faces, identification information for specifying only people whose lines of sight are not directed to the camera.

An example of a configuration of a data retrieving apparatus employing the line-of-sight discrimination processing described above is explained with reference to FIGS. 10A and 10B. Examples of configurations of retrieval processing apparatuses are shown in FIGS. 10A and 10B.

Figure 10A:
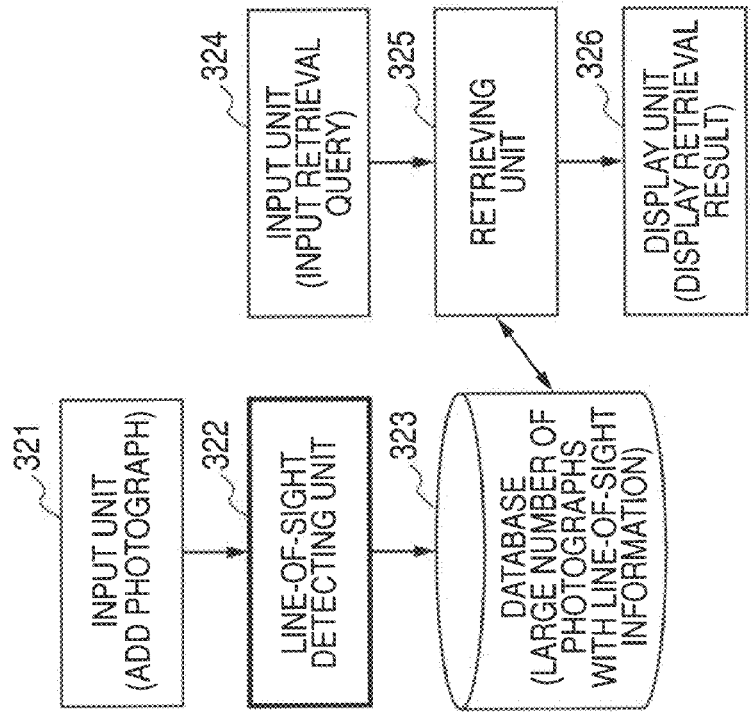
FIGS. 10A and 10B are diagrams for explaining a configuration and processing of a data retrieving apparatus to which the line-of-sight discrimination processing according to the embodiment is applied.
Figure 10B:
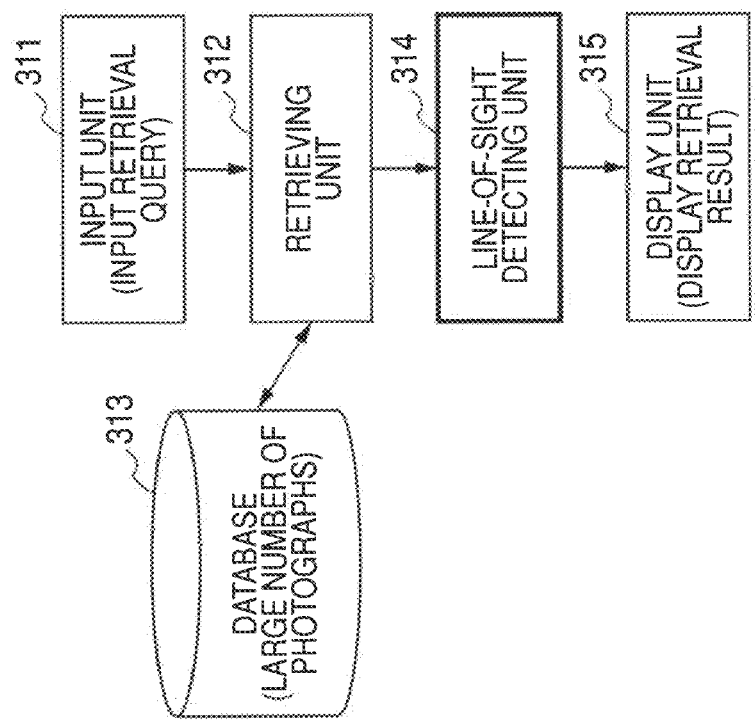

FIG. 10A is a diagram of an apparatus that retrieves an image matching a retrieval condition from a database 313 in which a large number of image data of photographs and the like are stored. This retrieving apparatus can be realized by the information processing apparatus such as a PC. An input unit 311, a retrieving unit 312, the database 313, a line-of-sight detecting unit 314, and a display unit 315 shown in FIG. 10A can be realized by using functions of the information processing apparatus such as a PC. The line-of-sight detecting unit 314 has the processing configuration explained with reference to FIG. 2 above and executes the line-of-sight discrimination processing explained with reference to FIG. 5. Programs for executing data retrieval processing by the retrieving unit 312 and the line-of-sight detection processing by the line-of-sight detecting unit 314 are stored in the storing unit of the information processing apparatus and executed by the control unit configured by a CPU or the like.

The input unit 311 inputs a retrieval query for selecting, out of the large number of image data stored in the database 313, only an image that is a photographed image in a certain period and in which a face of a person is included and a line-of-sight of the face of the person is directed in a camera direction.

First, the retrieving unit 312 retrieves image data in the period from the database 313 on the basis of, for example, period information set in the retrieval query. A retrieved image is passed to the line-of-sight detecting unit 314 and line-of-sight discrimination processing for the retrieval result image is executed. In other words, the line-of-sight discrimination processing is executed according to the processing to which the processing configuration shown in FIG. 2 is applied, specifically, the flowchart shown in FIG. 5.

The line-of-sight detecting unit 314 generates a discrimination result concerning whether a line of sight of a face included in the retrieval result image is in either of two states of the positive state in which a line of sight is directed to a camera or the negative state in which a line of sight is not directed to a camera. The line-of-sight detecting unit 314 outputs judgment result information to the display unit 315. The display unit 315 performs processing for selecting and displaying only an image including a face in the positive state, i.e., an image in which a line of sight is directed to the camera.

Like FIG. 10A, FIG. 10B is a diagram of an apparatus that retrieves an image matching a retrieval condition from a database 323 in which a large number of image data of photographs and the like are stored. This apparatus is set to execute, when image data is stored in the database 323, line-of-sight discrimination for the image data and store a line-of-sight discrimination result in the database 323 as meta-information corresponding to the image data.

When image data to be stored in the database 323 is inputted from an input unit 321, a line-of-sight detecting unit 322 executes line-of-sight discrimination processing for an image. In other words, the line-of-sight discrimination processing is executed according to the processing to which the processing configuration shown in FIG. 2 is applied, specifically, the flowchart shown in FIG. 5. The line-of-sight detecting unit 322 generates a discrimination result concerning whether a line of sight of a face included in the retrieval result image is in either of two states of the positive state in which a line of sight is directed to a camera or the negative state in which a line of sight is not directed to a camera. The line-of-sight detecting unit 322 sets discrimination result information as meta-information corresponding to the image and stores the discrimination result information in the database 323 together with the image data.

In retrieval processing, a retrieval query is inputted from an input unit 324. For example, the input unit 324 inputs a retrieval query for selecting, out of the large number of image data stored in the database 323, only an image that is a photographed image in a certain period and in which a face of a person is included and a line of sight of the face of the person is directed in the camera direction. A retrieving unit 325 executes data retrieval using period information and the line-of-sight discrimination information as metadata set in stored images in the database 323, acquires data matching the retrieval query, and displays the data on a display unit 326. For example, only an image in which a face in the positive state is included, i.e., an image in which a line of sight is directed to the camera is displayed on the display unit 326.

FIGS. 11A and 11B are diagrams for explaining examples of a configuration and processing of a moving image data managing apparatus having the line-of-sight discrimination processing function described above. The apparatus shown in FIGS. 11A and 11B is configured by, for example, a video camera. In FIG. 11A, when processing for storing moving image data in the storing unit 413 is performed, line-of-sight discrimination for image data is executed and a line-of-sight discrimination result is recorded as a separate file independent from an image file.

For example, photographed moving image data is inputted from an input unit 411. A line-of-sight detecting unit 412 executes line-of-sight discrimination processing for respective frames forming a moving image. In other words, the line-of-sight discrimination processing is executed according to the processing to which the processing configuration shown in FIG. 2 is applied, specifically, the flowchart shown in FIG. 5. The line-of-sight detecting unit 412 generates a discrimination result concerning whether a line of sight of a face included in a retrieval result image is in either of two states of the positive state in which a line of sight is directed to a camera or the negative state in which a line of sight is not directed to a camera.

A moving image data file and a line-of-sight information file in which line-of-sight detection result information of the line-of-sight detecting unit 412, i.e., line-of-sight discrimination result information corresponding to face images included in respective frame images is recorded are recorded in the storing unit 413.

In FIG. 11B, when processing for storing moving image data in the storing unit 424 is performed, line-of-sight discrimination for the moving image data is executed and a line-of-sight discrimination result is recorded as metadata of the moving image data.

For example, photographed moving image data is inputted from the input unit 421. The line-of-sight detecting unit 422 executes line-of-sight discrimination processing for respective frames forming a moving image. In other words, the line-of-sight discrimination processing is executed according to the processing to which the processing configuration shown in FIG. 2 is applied, specifically, the flowchart shown in FIG. 5. The line-of-sight detecting unit 422 generates a discrimination result concerning whether a line of sight of a face included in a retrieval result image is in either of two states of the positive state in which a line of sight is directed to a camera or the negative state in which a line of sight is not directed to a camera.

A file creating unit 423 generates a file in which the discrimination result concerning whether a line of sight of a face included in each image frame as metadata of moving image data is in either of two states of the positive state in which a line of sight is directed to a camera or the negative state in which a line of sight is not directed to a camera is set. A generated moving image file with metadata is recorded in a storing unit 424.

Figure 12:
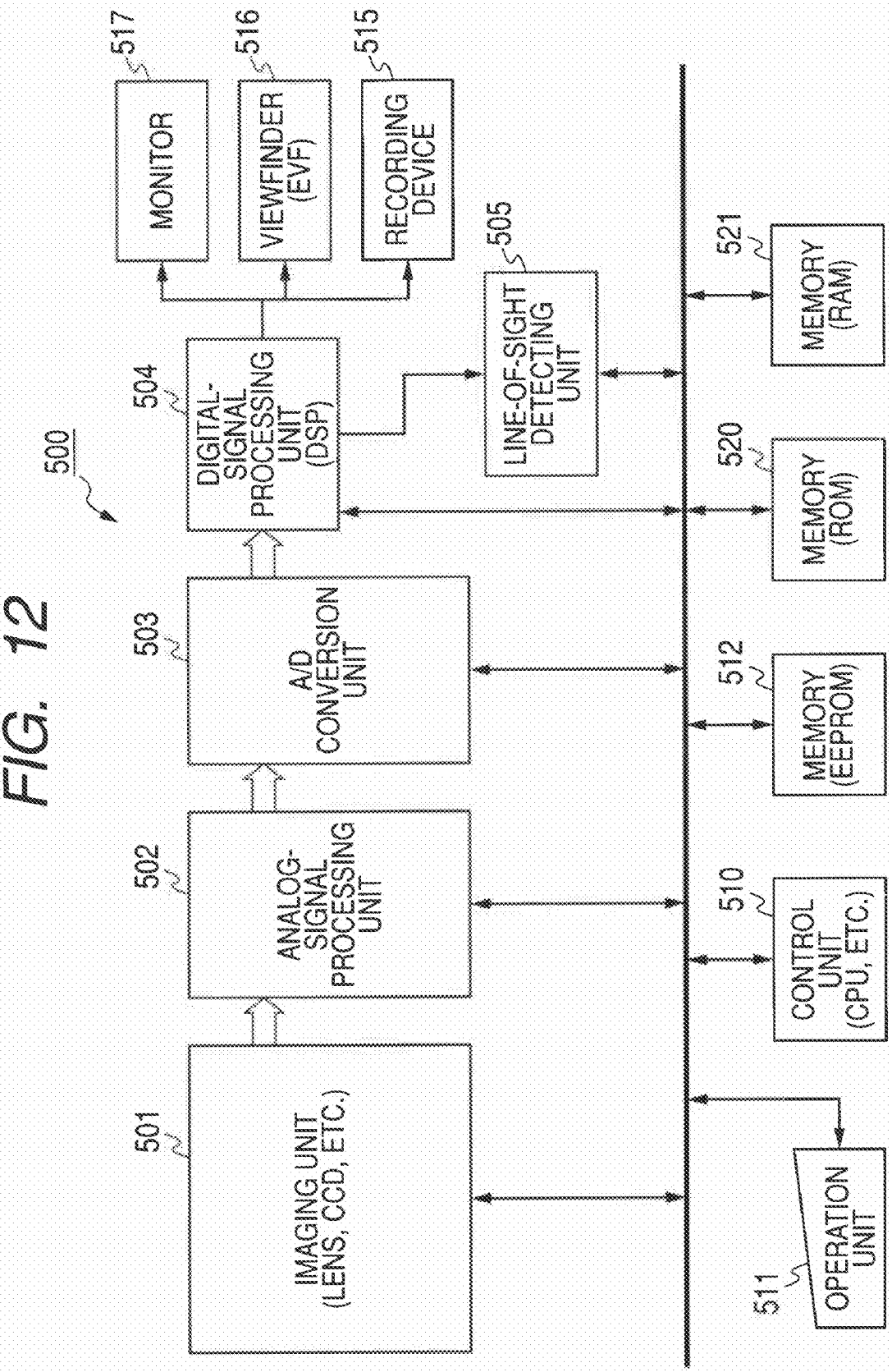
FIG. 12 is a diagram for explaining an example of a hardware configuration of an imaging apparatus as an example of the information processing apparatus according to the embodiment.

Lastly, an example of a hardware configuration of the imaging apparatus and an example of a hardware configuration of the PC, which are examples of the information processing apparatus according to this embodiment, are explained with reference to FIGS. 12 and 13. FIG. 12 is a diagram of an example of a hardware configuration of the imaging apparatus as an example of the information processing apparatus according to this embodiment.

In an imaging apparatus 500, a photographing signal acquired by an imaging unit 501 such as a lens or a CCD (Charge Coupled Device) is inputted to an analog-signal processing unit 502. The analog-signal processing unit 502 performs processing such as noise removal. An A/D conversion unit 503 converts the photographing signal into a digital signal. Data subjected to digital conversion is subjected to digital signal processing such as data compression by a digital-signal processing unit 504 and, then, recorded in a recording device 515 configured by a flash memory or the like. Moreover, the data is displayed on a monitor 517 and a viewfinder (EVF) 516.

An operation unit 511 includes, besides a shutter and the like provided in a camera main body, a reproduction designation switch for the data recorded in the recording device 515 and switches for starting processing such as fast-forward reproduction and rewinding reproduction.

The control unit 510 includes a CPU and executes control of various kinds of processing, which are executed by the imaging apparatus, according to programs stored in a memory (a ROM) 520 and the like in advance. A memory (an EEPROM) 512 is a nonvolatile memory. Image data, various auxiliary information, programs, and the like are stored in the memory 512. The memory (the ROM) 520 stores programs, arithmetic operation parameters, and the like used by the control unit (the CPU) 510. A memory (a RAM) 521 stores programs used in the control unit (the CPU) 510, parameters that change as appropriate in execution of the programs, and the like.

A line-of-sight detecting unit 505 executes face detection, eye-nose-mouth detection, line-of-sight discrimination processing, and the like. For example, the line-of-sight detecting unit 505 performs the detection of a face area and a line of sight from the image explained with reference to FIG. 5 above and inputs a detection result to the digital-signal processing unit 504. The digital-signal processing unit 504 executes, for example, processing for setting the detection result as metadata and recording the detection result in the recording device 515.

FIG. 13 is a diagram of an example of a hardware configuration of a personal computer as an example of the information processing apparatus according to this embodiment. A CPU (Central Processing Unit) 701 executes various kinds of processing according to programs stored in a ROM (Read Only Memory) 702 or a storing unit 708. For example, the CPU 701 executes processing programs for the face detection, the eye-nose-mouth detection, and the line-of-sight discrimination processing explained in the example described above. Programs executed by the CPU 701, data, and the like are stored in a RAM (Random Access Memory) 703 as appropriate. The CPU 701, the ROM 702, and the RAM 703 are connected to one another by a bus 704.

The CPU 701 is connected to an input/output interface 705 via the bus 704. An input unit 706 including a keyboard, a mouse, and a microphone and an output unit 707 including a display and a speaker are connected to the input/output interface 705. The CPU 701 executes various kinds of processing in response to commands inputted from the input unit 706 and outputs processing results to, for example, the output unit 707.

A storing unit 708 connected to the input/output interface 705 includes, for example, a hard disk and stores the programs executed by the CPU 701 and various data. The communication unit 709 communicates with an external apparatus via networks such as the Internet and a local area network.

A drive 710 connected to the input/output interface 705 drives a removable medium 711 such as a magnetic disk, an optical disk, a magneto-optical disk, or a semiconductor memory and acquires a program, data, and the like recorded therein. The acquired program and data are transferred to and stored in the storing unit 708 when necessary.

The present invention has been explained in detail with reference to the specific embodiment. However, it is obvious that those skilled in the art can make correction and substitution of the embodiment without departing from the spirit of the present invention. In other words, the present invention has been disclosed in a form of illustration and should not be limitedly interpreted. To judge the gist of the present invention, the patent claims should be taken into account.

The series of processing explained in this specification can be executed by hardware, software, or a combination of the hardware and the software. When the processing by the software is executed, it is possible to install a program having a processing sequence recorded therein in a memory in a computer incorporated in dedicated hardware and cause the computer to execute the program or install the program in a general-purpose computer, which can execute various kinds of processing, and cause the general-purpose computer to execute the program. For example, the program can be recorded in a recording medium in advance. Besides installing the program from the recording medium to the computer, the program can be received through a network such as a LAN (Local Area Network) or the Internet and installed in a recording medium such as a built-in hard disk or the like.

The various kinds of processing described in this specification are not only executed in time series according to the description but may be executed in parallel or individually according to a processing ability of an apparatus that executes the processing or when necessary. In this specification, a system is a configuration of a logical set of plural apparatuses and is not limited to a system in which apparatuses having individual configurations are provided in an identical housing.

As explained above, in the embodiment of the present invention, a face area and face components such as eyes, a nose, and a mouth included in an image are detected. The line-of-sight discriminating unit executes line-of-sight discrimination processing for a face image from which the eyes, the nose, and the mouth are detected. As the line-of-sight discrimination processing, the line-of-sight discriminating unit performs processing for discriminating whether a line of sight of the face image data from which the face component is detected is in either of two states of a positive state in which a line of sight is directed in a camera direction or a negative state in which a line of sight is not directed in a camera direction using a line-of-sight discrimination dictionary in which learning data including classification data corresponding to the respective states are stored. Specifically, the line-of-sight discriminating unit performs the line-of-sight discrimination processing by applying the PixDif algorism that uses a difference value of a pixel pair in a specific position of an image as comparison and collation data. According to the embodiment, the line-of-sight discrimination is based on clear discrimination of two states, i.e., a state in which a line of sight is directed in a camera direction and a state in which a line of sight is not directed in a camera direction. Therefore, accuracy of the discrimination processing is high and a value of use of a discrimination result is also high.

It should be understood by those skilled in the art that various modifications, combinations, sub-combinations, and alterations may occur depending on design requirements and other factors insofar as they are within the scope of the appended claims or the equivalents thereof.

What is claimed is:

1. An information processing apparatus, comprising:
   a face detecting unit, implemented on a hardware processor of the information processing apparatus, that detects a face area included in image data;
   a face-component detecting unit that detects a face component from the face area detected by the face detecting unit; and
   a line-of-sight discriminating unit that executes line-of-sight discrimination processing for a face image from which the face component is detected, wherein
   the line-of-sight discriminating unit executes processing for discriminating a state of a line of sight of face image data of the face image from which the face component is detected, the state being one of a positive state in which the line of sight is directed in a camera direction and a negative state in which the line of sight is not directed in the camera direction, the processing being based on collation processing of the face image data with respect to a line-of-sight discrimination dictionary in which learning data, including a plurality of face images classified in the positive state and a plurality of face images classified in the negative state, is stored, and
   a warning output unit outputs the warning signal when a face image classified in the negative state is included in a line of sight of a face included in an acquired image of the imaging apparatus.

2. The information processing apparatus according to claim 1, wherein the face-component detecting unit detects eyes, a nose, and a mouth from the face area detected by the face detecting unit, and
   the line-of-sight discriminating unit executes the line-of-sight discrimination processing for the face image data from which the eyes, the nose, and the mouth are detected.

3. The information processing apparatus according to claim 1, wherein the line-of-sight discriminating unit executes the line-of-sight discrimination processing according to an algorithm that uses a difference value, of a pixel pair in a specific position of an image, as comparison and collation data.

4. The information processing apparatus according to claim 1, further comprising an image processing unit that executes rotation processing, size normalization processing, and face-area slicing processing for the face image from which the face component is detected by the face-component detecting unit, wherein the line-of-sight discriminating unit inputs the face image processed by the image processing unit and executes the line-of-sight discrimination processing.

5. The information processing apparatus according to claim 1, wherein the face detecting unit executes, with reference to a face detection dictionary in which different types of face area image information are stored, and face-area detection processing the face area included in the image data using an algorithm that uses a difference value, of a pixel pair in a specific position of an image, as comparison and collation data.

6. The information processing apparatus according to claim 1, wherein the face-component detecting unit executes, with reference to a face component detection dictionary in which different types of face component image information are stored, and face-component detection processing for detecting the face component from the face area detected by the face detecting unit using an algorithm that uses a difference value, of a pixel pair in a specific position of an image, as comparison and collation data.

7. The information processing apparatus according to claim 1, further comprising a sound recognizing unit that executes sound recognition processing, wherein the information processing apparatus combines a line-of-sight discrimination result in the line-of-sight discriminating unit and a sound recognition result in the sound recognizing unit and executes analysis of a speaker.

8. The information processing apparatus according to claim 1, wherein the information processing apparatus is an imaging apparatus, the information processing apparatus further includes a shutter control unit that is inputted with a line-of-sight discrimination result in the line-of-sight discriminating unit and executes shutter control for the imaging apparatus, and the shutter control unit performs control for disabling a shutter operation when a face image classified in the negative state is included in a line of sight of a face included in an acquired image of the imaging apparatus.

9. The information processing apparatus according to claim 1, further comprising a frame selecting unit that is inputted with a line-of-sight discrimination result corresponding to plural image frames discriminated by the line-of-sight discriminating unit and performs selection processing for the image data, wherein the frame selecting unit performs selection of an image frame from the image data based on whether the line-of-sight discrimination result specifies the positive state or the negative state, for each of the plural image frames.

10. The information processing apparatus according to claim 1, wherein the information processing apparatus applies a line-of-sight discrimination result of the line-of-sight discriminating unit to data retrieval processing and executes retrieval processing for selecting and extracting an image that is in one of the positive state in which the line of sight is directed in the camera direction and the negative state in which the line of sight is not directed in the camera direction.

11. The information processing apparatus according to claim 1, wherein the information processing apparatus performs processing for storing a line-of-sight discrimination processing result of the image data in a storing unit as correspondence information, with the image data.

12. The information processing apparatus according to claim 1, wherein when the species of a subject in the image data is a cat, the plurality of face images classified in the positive state and the plurality of images classified in the negative state include face images of cats.

13. The information processing apparatus according to claim 1, wherein when the species of a subject in the image data is a dog, the plurality of face images classified in the positive state and the plurality of images classified in the negative state include face images of dogs.

14. The information processing apparatus according to claim 1, wherein the information processing apparatus is an imaging apparatus having an image capture function that is controlled based on a line-of-sight discrimination result.

15. The information processing apparatus according to claim 1, wherein the information processing apparatus is an imaging apparatus having an image capture function that is disabled based on a line-of-sight discrimination result.

16. The information processing apparatus according to claim 1, wherein the information processing apparatus is an imaging apparatus having an image capture function that is augmented with an output display based on a line-of-sight discrimination result.

17. The information processing apparatus according to claim 1, further comprising: a rotation-correction processing unit that performs image rotation correction using a positional relationship among eyes, a nose, and a mouth in the face image.

18. An information processing method, executed in an information processing apparatus, the information processing method comprising:

detecting, by a hardware processor of the information processing apparatus, a face area included in image data;

detecting, by the information processing apparatus, a face component from the face area detected in the face detecting step;

executing, by the information processing apparatus, line-of-sight discrimination processing for a face image from which the face component is detected in the face-component detecting step, the line-of-sight discriminating including executing processing for discriminating a state of a line of sight of face image data of the face image from which the face component is detected, the state being one of a positive state in which the line of sight is directed in a camera direction and a negative state in which a line of sight is not directed in the camera direction, the processing being based on collation processing of the face image with respect to a line-of-sight discrimination dictionary in which learning data, including a plurality of face images classified in the positive state and a plurality of face images classified in the negative state, is stored;

determining, by a warning output unit of the information processing apparatus, whether to output a warning signal based on a line-of-sight discrimination result from the line-of-sight discriminating; and outputting the warning signal when a face image classified in the negative state in is included in a line of sight of a face included in an acquired image of the imaging apparatus.

19. The information processing method according to claim 18, wherein the face-component detecting detects eyes, a nose, and a mouth from the face area detected in the face detecting step, and the line-of-sight discriminating executes the line-of-sight discrimination processing for the face image data from which the eyes, the nose, and the mouth are detected.

20. The information processing method according to claim 18, wherein the line-of-sight discriminating executes the line-of-sight discrimination processing according to an algorithm that uses a difference value, of a pixel pair in a specific position of an image, as comparison and collation data.

21. The information processing method according to claim 18, further comprising executing rotation processing, size normalization processing, and face-area slicing processing for the face image from which the face component is detected in the face-component detecting, wherein
the line-of-sight discriminating inputs the face image processed in the image processing and executing the line-of-sight discrimination processing.

22. The information processing method according to claim 18, wherein the face detecting executes, with reference to a face detection dictionary in which different types of face area image information are stored, and
face-area detection processing of the face area included in the image data using an algorithm that uses a difference value, of a pixel pair in a specific position of an image, as comparison and collation data.

23. The information processing method according to claim 18, wherein the face-component detecting executes, with reference to a face component detection dictionary in which different types of face component image information are stored, and
face-component detection processing for detecting the face component from the face area detected in the face detecting using an algorithm that uses a difference value, of a pixel pair in a specific position of an image, as comparison and collation data.

24. The information processing method according to claim 18, further comprising:
executing sound recognition processing; and
combining a line-of-sight discrimination result and a sound recognition result in the sound recognizing and executing analysis of a speaker.

25. The information processing method according to claim 18, wherein
the information processing apparatus is an imaging apparatus,
the information processing method further includes inputting a line-of-sight discrimination result in the line-of-sight discriminating and executing shutter control for the imaging apparatus, and
the shutter control includes performing control for disabling a shutter operation when a face image classified in the negative state is included in a line of sight of a face included in an acquired image of the imaging apparatus.

26. The information processing method according to claim 18, further comprising: inputting a line-of-sight discrimination result corresponding to plural image frames discriminated in the line-of-sight discriminating and performing selection processing for the image data, wherein
the frame selecting includes selecting an image frame from the image data based on whether the line-of-sight discrimination result specifies the positive state or the negative state, for each of the plural image frames.

27. The information processing method according to claim 18, further comprising applying a line-of-sight discrimination result in the line-of-sight discriminating to data retrieval processing and executing retrieval processing for selecting and extracting an image that is in one of the positive state in which the line of sight is directed in the camera direction and the negative state in which the line of sight is not directed in the camera direction.

28. The information processing method according to claim 18, further comprising performing processing to store a line-of-sight discrimination processing result of the image data in a storing unit as correspondence information, with the image data.

29. The information processing method according to claim 18, further comprising: performing, by the information processing apparatus, an image rotation correction using a positional relationship among eyes, a nose, and a mouth in the face image.

30. An information processing apparatus, comprising:
a face detecting unit, implemented on a hardware processor of the information processing apparatus, that detects a face area included in image data;
a face-component detecting unit that detects a face component from the face area detected by the face detecting unit; and
a line-of-sight discriminating unit that executes line-of-sight discrimination processing for a face image from which the face component is detected, wherein
the line-of-sight discriminating unit executes processing for discriminating a state of a line of sight of face image data of the face image from which the face component is detected, the state being one of a positive state in which the line of sight is directed in a camera direction and a negative state in which the line of sight is not directed in the camera direction, the processing being based on collation processing of the face image data with respect to a line-of-sight discrimination dictionary in which learning data, including a plurality of face images classified in the positive state and a plurality of face images classified in the negative state, is stored, and
a warning output unit determines whether to output a warning signal based on a line-of-sight discrimination result from the line-of-sight discriminating unit
wherein a different type of the line-of-sight discrimination dictionary is used based on the species of a subject, in the image data, corresponding to the face image, and
wherein the different type of a line-of-sight discrimination dictionary includes a plurality of images of subjects of the same species as the subject classified in the positive state and a plurality of images of subjects of the same specifies as the subject classified in the negative state.

31. An imaging apparatus, comprising:
a face detecting unit, implemented on a hardware processor of the imaging apparatus, that detects a face area included in image data;
a face-component detecting unit that detects a face component from the face area detected by the face detecting unit; and
a line-of-sight discriminating unit that executes line-of-sight discrimination processing for a face image from which the face component is detected, the line-of-sight discriminating unit executing processing for discriminating a state of a line of sight of face image data of the face image from which the face component is detected, the state being one of a positive state in which the line of sight is directed in a camera direction and a negative state in which the line of sight is not directed in the camera direction, the processing being based on collation processing of the face image data with respect to a line-of-sight discrimination dictionary in which learning data, including classification data corresponding to the positive and negative states, is stored;

a shutter control unit that executes a shutter control operation for the imaging apparatus based on a line-of-sight discrimination result, the shutter control operation disabling the shutter control unit when the line-of-sight discrimination result indicates that at least a portion of the face image data is classified in the negative state.

* * * * *